United States Patent
Tomochika et al.

(10) Patent No.: US 11,276,194 B2
(45) Date of Patent: Mar. 15, 2022

(54) LEARNING DATASET CREATION METHOD AND DEVICE

(71) Applicant: NATIONAL UNIVERSITY CORPORATION NARA INSTITUTE OF SCIENCE AND TECHNOLOGY, Nara (JP)

(72) Inventors: Keita Tomochika, Nara (JP); Takuya Kiyokawa, Nara (JP); Tsukasa Ogasawara, Nara (JP); Jun Takamatsu, Nara (JP); Ming Ding, Nara (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 0 days.

(21) Appl. No.: 17/042,481

(22) PCT Filed: Mar. 28, 2019

(86) PCT No.: PCT/JP2019/013793
§ 371 (c)(1),
(2) Date: Sep. 28, 2020

(87) PCT Pub. No.: WO2019/189661
PCT Pub. Date: Oct. 3, 2019

(65) Prior Publication Data
US 2021/0012524 A1    Jan. 14, 2021

(30) Foreign Application Priority Data
Mar. 29, 2018   (JP) .............................. JP2018-066282

(51) Int. Cl.
*G06T 7/70*   (2017.01)
(52) U.S. Cl.
CPC ..................................... *G06T 7/70* (2017.01)

(58) Field of Classification Search
CPC ............. G06K 9/3208; G06K 9/00671; G06K 9/00201; G06K 9/627; G06K 9/6256;
(Continued)

(56) References Cited

U.S. PATENT DOCUMENTS

| | | | | |
|---|---|---|---|---|
| 2013/0345873 | A1* | 12/2013 | Blumberg | B25J 9/1676 700/259 |
| 2016/0167228 | A1* | 6/2016 | Wellman | B25J 9/1697 700/218 |

(Continued)

FOREIGN PATENT DOCUMENTS

| | | |
|---|---|---|
| JP | 2014-096661 A | 5/2014 |
| JP | 2017-102838 A | 6/2017 |

OTHER PUBLICATIONS

Tomochika, Keita, "Automatic annotation of training data using visual markers for object detection in automated factories", [retrieved on May 21, 2019], Internet:<https://library.naist.jp/mylimedio/dllimedio/showpdf2.cgi/DLPDFR014498_PI-53>, (Nara Institute of Science and Technology), 53 pages, non-official translation (Proceedings of Information Science PhD Thesis of Nara Institute of Science and Technology).

(Continued)

*Primary Examiner* — Syed Haider
(74) *Attorney, Agent, or Firm* — Ogilvie Law Firm

(57) ABSTRACT

Provided are a method and a device that can efficiently generate a training dataset. Object information is associated with a visual marker, a training dataset generation jig that is configured from a base part and a marker is used, said base part being provided with an area that serves as a guide for positioning a target object and said marker being fixed on the base part, the target object is positioned using the area as a guide and in this condition an image group of the entire object including the marker is acquired, the object information that was associated with the visual marker is acquired (Continued)

from the acquired image group, a reconfigured image group is generated from this image group by performing a concealment process on a region corresponding to the visual marker or the training dataset generation jig, a bounding box is set in the reconfigured image group on the basis of the acquired object information, information relating to the bounding box, the object information, and estimated target object position information and posture information are associated with a captured image, and a training dataset for performing object recognition and position/posture estimation for the target object is generated.

20 Claims, 25 Drawing Sheets

(58) Field of Classification Search
CPC ..... G06K 2009/3225; G06T 7/70; G06T 7/74; G06T 2207/20204; B25J 13/08
See application file for complete search history.

(56) References Cited

U.S. PATENT DOCUMENTS

| | | | | |
|---|---|---|---|---|
| 2017/0236013 | A1* | 8/2017 | Clayton | G06K 9/00221 382/104 |
| 2018/0253629 | A1* | 9/2018 | Bamba | G06K 9/6257 |
| 2019/0130219 | A1* | 5/2019 | Shreve | G06K 9/6257 |

OTHER PUBLICATIONS

Kehl, W. et al., SSD-6D: making RGB-based 3D detection and 6D pose estimation great again, 2017 IEEE International Conference on Computer Vision, IEEE [online], Dec. 25, 2017, pp. 1530-1538, [retrieved on May 21, 2019], Internet:<https://ieeexplore.ieee.org/stamp/stamp.jsp?tp=&arnumber=8237431>.

* cited by examiner (1)

(2)

(1)

(2)

(1)

(2)

(1)

(2)

(1)

(2)

(1)

(2)

(1)

(2)

(1)

(2)

LEARNING DATASET CREATION METHOD AND DEVICE

TECHNICAL FIELD

The present invention relates to an automated method for generating a training dataset in object recognition and position/posture estimation by machine learning.

BACKGROUND ART

Conventionally, robots equipped with artificial intelligence (hereinafter referred to as "AI") have been used as a tool for automation of operations in factories and the like. In recent years, with the development of machine learning and deep learning (deep learning), development of AI using machine learning and the like has been rapidly performed even in production systems in factories, etc., as an effort toward full automation of the factories.

There is a need for automation of work by robots in all industries, but among them, the food industry and the logistics industry are fields that are expected to grow in the future, and there is a high need for automation of work by robots.

However, since many products handled in the food industry and the logistics industry are flexible, and their shapes change intricately during handling, making it difficult to handle with a robot hand being equipped on a robot. Also, variety of the products handled in the food industry and the logistics industry used to be small, consisting mainly of mass production of small variety, but nowadays, not only that, but high-variety low-volume production and variety-variable variable production are required. However, there is also a problem that it is difficult to accurately and promptly recognize a wide variety of products. Namely, it is necessary to recognize a wide variety of products in a short time and to accurately perform sorting work such as assortment of gifts and removal of defective product.

Under these circumstances, it is a reality that automation of factories by robots is not yet sufficiently advanced in the food industry and the logistics industry.

In the past, in order to collect training data about a product, an image of a target object is captured, a target object is specified by a human hand from the obtained captured image and a bounding box is drawn, and such things have been done. In addition, data input of position and posture of an object have also been performed manually.

Therefore, a method of automating the work that had been done manually by human hands can be considered by attaching a marker to the object and shooting it.

However, in the method of shooting with a marker attached to an object, there have been problems such as, the positional relationship between the target object and the marker and also the number of markers have not been sufficiently examined, the marker is reflected in the target object or the bounding box, or, there is a problem that the marker is hidden by the target object.

Namely, when the marker is reflected in the target object or the bounding box, not only high-quality training data is not obtained, but also the marker may be learned as a feature of the object. Further, when the marker is hidden by the target object, there is a problem that the accuracy of object recognition is reduced.

As for the object recognition technology, a database construction system that automatically collects training data is known in the object recognition technology around a vehicle. (refer to Patent literature 1) This is to automatically collect machine learning supervised training data for recognizing an object from the output of another sensor using the detection result of the sensor as teacher data.

However, the database construction system disclosed in Patent Document 1 above is a technique for recognizing an object using a plurality of types of sensors, and requires a detectable learnt sensor.

Also, an image generation method capable of generating a training image used for machine learning for image recognition from an image whose shooting condition is unknown is known. (refer to Patent literature 2) This is to generate a third new training image from the two images possessed in order to generate the training image for image recognition.

However, the image generation method disclosed in Patent Document 2 above has a problem that a high-quality training dataset cannot be generated because an image different from the actual environment is generated.

Further, although the position and posture of an object is estimated by an RGB camera, a method using a 3D model of the object is known. (refer to Non-patent literature 1) However, in the method disclosed in Non-Patent Document 1 described above, a 3D model of an object is always required in advance, and a training image thus generated is different from the actual environment, so that a high-quality training dataset cannot be generated, which is a problem.

Regarding the problem that the marker is reflected in the captured image and the marker is learned as a feature of the object, a method of concealing the marker from the captured image can be considered.

In this respect, a technique is known in which the moving object you want to hide is hidden in real time while the movie is being shot, while the actual scene being shot remains the same. (refer to Patent literature 3) This is to detect a moving object in a moving image, calculate the moving direction and speed, and speculatively acquire a background image when the moving object moves in the calculated moving direction and speed. The speculatively acquired background image is used to hide the moving object in real time.

However, there is a problem that only the moving object disclosed in Patent Document 3 above can be hidden.

PRIOR ART

Patent Literature

[Patent literature 1] JP2017-102838A
[Patent literature 2] JP2017-45441A
[Patent literature 3] JP2014-96661A Non-Patent Literature

[Non-patent literature 1] Wadim Kehl et al., "SSD-6D: Making RGB-Based 3D Detection and 6D Pose Estimation Great Again", ICCV 2017, pp. 1521-1529

OUTLINE OF THE INVENTION

Problems to be Solved by the Invention

In view of such a situation, the present invention aims to provide a method for efficiently generating a training dataset to be used for machine learning by using filmed images of a real environment without requiring a plurality of sensors and a 3D models of the subject and a concealment method of visual marker groups, to be used for robot control employed to automated system of factories.

Means to Solve the Objects

In order to solve the problems mentioned above, a training dataset generation method of the present invention, after relating substance information of an object to a visual marker, acquires an image group of a whole object including a marker in a state wherein an object is arranged using an area as a guide by using a base portion with an area to be a guide to a placement position of an object being disposed and a training dataset generation jig constituted of a maker fixed on said base portion. And then, the object information associated with the visual marker is acquired from the acquired image group, generate an image group reconstructed by conducting concealment processing of the area corresponding to a visual marker or a training dataset generation jig from an image group and a bounding box of the object against a reconstructed image group is set up. Then, the posture information, position information, object information and information regarding bounding box estimated from the captured image, are correlated to captured images to generate a training dataset for object recognition and position posture estimation.

Here, the visual marker refers to a marker that can measure posture and position with high accuracy in autonomous work of the robot. By using the visual marker, not only the object information of the target object but also the posture information and the position information can be acquired at the same time from the captured image, and the training dataset can be efficiently generated.

Since the visual marker is provided on the base portion and around the area, it is possible to prevent the object from being hidden by the visual marker. It is preferable that a plurality of visual markers be fixed to the base portion in a predetermined positional relationship with the object. By providing a plurality of visual markers, for example, even if a certain visual marker is hidden by the object due to the shooting angle, it is possible to recognize the object by detection of another visual marker. Further, by detecting two or more visual markers at the same time, it is possible to perform more accurate object recognition.

The method of acquiring the image group may be one in which the object is photographed and acquired while moving the object, or one in which a plurality of cameras is used. In any case, by collecting a large number of captured images of the object taken from different angles, it is possible to use it as training data for machine learning.

Since the captured image itself used to generate the training dataset is not processed except for the concealment processing of the training dataset generation jig area, which will be described later, machine learning can be performed using an imaging image close to the imaging image to be obtained in an actual environment wherein a learnt model is utilized. Machine learning can be performed using a captured image close to the image. Therefore, the accuracy of object recognition and position/posture estimation can be improved.

Note that the object information of the target object refers to basic information such as the name and the size of the target object, and this information is stored in advance in the computer when the training dataset is generated.

Also, a bounding box is a display area surrounded by a target object in an image or the like, and is a rectangular area or the like. When setting the bounding box of the object for the acquired images, the center of gravity of the object is acquired as the position information of the object in order to ensure that the bounding box surrounds the entire object as much as possible.

In the training dataset generation method of the present invention, it is preferable that concealment processing of the area corresponding to training dataset generation jig is conducted; the concealment processing is furnished with the following steps 1)~3).
1) An area corresponding to the training dataset generation jig is detected from the image group (detection step).
2) Only the area corresponding to the training dataset generation jig is extracted by detecting the object area from the area including the reflection of the target object extracted in the detection step (extraction step).
3) The image group in the area extracted in the extraction step is overwritten as a background image or a noise image (overwrite step).

Here, the extraction step in the above-described concealment processing may be performed by detecting the object region by using the shape information approximated in advance, or may be by detecting the object region by using a learning model learned in advance.

By concealing the area corresponding to the training dataset generation jig, it can be prevented that a base portion and a visual marker that constitute a training dataset generation jig are recognized as a part of an object by a computer.

In the overwrite step, it is preferable to perform overwrite processing as a noise image for the image group in the area extracted in the extraction step. By performing the overwriting process as a noise image, the recognition rate can be improved for a wide variety of objects.

In the training dataset generation method of the present invention, the base portion is preferably a circular, elliptical, or rectangular plate, but may be an L-shaped plate formed by bending and extending the plate. This is because, in the case of a circular plate, for example, a multi-viewpoint image can be easily acquired by rotating the plate and taking an image again.

In the training dataset generation method of the present invention, when the base portion is circular, the visual markers are preferably arranged so as to surround the area with the center point of the area as the upward direction. Since the area has a role of a guide when arranging the object, the object is often arranged in the center of the area, and each visual marker is arranged so that the center point is in the upward direction. As a result, the visual marker can be easily detected even when the object is photographed from various angles. Therefore, a guide indicating the center point may be further provided at the center of the area.

In the training dataset generation method of the present invention, the bounding box is preferably a 2-dimensional bounding box or a 3-dimensional bounding box. For example, in a case wherein three visual markers are provided, by detecting a plurality of markers at the same time, not only more accurate object recognition is possible but also the estimation accuracy of the position and posture of the object is improved, making it possible to set a 3-dimensional bounding box in which an object fits well.

The visual marker used in the training dataset generation method of the present invention may be a 2-dimensional pattern marker including an AR (Augmented Reality) marker or a 3-dimensional marker. The AR marker is a pattern image that serves as a marker for designating a position where additional information is displayed in the augmented reality system. Further, as the 3-dimensional marker, for example, a spherical marker used in the optical motion capture system can be used. When detecting the position and the posture with these spherical markers, three or more spherical markers are fixed on the base portion of the training dataset generation jig.

The identification ID of the training dataset generation jig may be displayed in the area in the training dataset generation method of the present invention.

The management ID of the training dataset generation jig becomes easy by displaying the identification ID of the training dataset generation jig in the area. It is preferable that the display of the identification ID is provided in the central portion of the area that is easily hidden when the object is placed in order to prevent reflection in the acquired image.

In the training dataset generation method of the present invention, the area may be provided with an orientation adjustment guide for adjusting the orientation of the object. By providing the orientation adjustment guide, management of the object information on the database becomes easier and convenience is improved.

The position information in the training dataset generation method of the present invention can use the position information of an arbitrary point of the object. Regarding arbitrary points, position information of the points in the reference posture of the object is registered in advance. In that case, the position information is difference information between the position of the point of the object arranged with the area as a guide and the position of the point of the reference posture in the reference coordinate system.

Further, when the position information in the training dataset generation method of the present invention is the center of gravity position information, the center of gravity position information is the differential information between the center of gravity position of the object arranged with the base portion as a guide and the barycentric position of the reference posture in the reference coordinate system.

Here, instead of the reference coordinate system, the camera coordinate system can be used to represent the posture information and the position information of the object. For example, when an image is picked up by one fixed camera, the posture information and the position information of the object are represented by the 3-dimensional coordinates in the camera coordinate system of that camera. Then, by converting the 3-dimensional coordinates of the camera coordinate system into the 3-dimensional coordinates of the real space and transmitting the 3-dimensional coordinates of the real space to the robot, the robot can accurately capture the object.

The posture information in the training dataset generation method of the present invention is, specifically, information calculated using a captured image of a visual marker and a relative positional relationship between the visual marker and an object, and it is the difference information between the posture of the area arranged as a guide and the reference orientation in the predefined reference coordinate system. By estimating the posture of the target object using the captured image of the visual marker and the relative positional relationship between the visual marker and the target object, highly accurate posture estimation becomes possible.

The reference coordinate system can be defined, for example, by using a visual marker previously attached to the training dataset generation jig as a reference marker and arranging the position and the posture to be the reference. By doing so, the data regarding the reference position and the reference posture of the reference marker are stored as a database, and the reference coordinate system of the real space is used at the stage of generating the training dataset, and the difference between the position and the posture in the reference coordinate system is used to bind to the image as information of the position and the posture.

Even if the reference marker indicating the reference coordinate system does not exist in the captured image, the reference coordinate system can be recognized from the captured image. For example, if the camera is fixed by itself, if the reference coordinate system can be set by the reference marker in the captured image before zooming, as long as the zoom magnification is known even if it becomes invisible after zooming, it is possible to calculate the position and the posture of the reference marker outside the captured image.

On the other hand, when a plurality of cameras are fixed and if the positional relationship between each camera is known in advance, even when a reference marker indicating the reference coordinate system is not present within a captured image, it is possible to calculate the position and the posture of the reference marker outside the captured image. Also, even when a reference marker is placed at a position that can be seen by only one camera, it is possible to calculate the reference coordinates by using an image taken under the state wherein a tentative reference marker is arranged at the place whereat imaging is possible simultaneously by both a visible camera and a non-visible camera. Further, also in a case wherein a camera moves dramatically, the reference coordinate can be calculated as long as the positional relationship between the position of the camera at the time when the reference coordinate is photographed and the position of the camera at the movement destination.

The image group acquired in the training dataset generation method of the present invention may be acquired by imaging the object while the object is placed on the training dataset generation jig and conveyed by the conveying means. Also, the object may be placed on the training dataset generation jig and imaged and acquired while being rotated by the rotating means. Furthermore, the object may be photographed and image-acquired while being placed on the training dataset generation jig and moved by the moving means. A multi-viewpoint image group can be easily acquired by these imaging acquisition methods. Any of these image acquisition methods may be used in combination. By using the conveying means, the rotating means, and the moving means, even if only one camera is used as the imaging means, a multi-viewpoint image group can be easily acquired, and the training dataset generation work can be performed with convenience and the operation time is saved.

Here, the transport means is for transporting an object using a transport path as a lane. Specifically, a belt conveyor that transports an object with a transport belt is preferably used while the object is placed on a training dataset generation jig. Further, as the rotation means, for example, a rotation mechanism that can rotate in a horizontal plane is used in a state where the object is placed on the training dataset generation jig. Further, as the moving means, for example, a linear motion mechanism is used in which the training dataset generation jig can move on a horizontal straight rail with the object placed on the training dataset generation jig. Furthermore, a rotary movement mechanism that can move while rotating by combining a rotary mechanism and a linear motion mechanism can also be used. These rotating mechanisms, linear motion mechanisms, and rotational moving mechanisms can be mounted on a belt conveyor to acquire a multi-viewpoint image group with a single camera.

Further, in the sense of acquiring a multi-viewpoint image group, means for automatically or manually deforming an object may be provided. By providing the means for applying deformation, it is possible to acquire a wider image group. As the object that is considered to be effectively deformed, a deformed object such as a pouch is targeted. Therefore, as a means for deforming such an object, for example, a method of automatically deforming by using a robot arm and a hand, a method of manually deforming by a person, and a method of preparing a pedestal for deforming a posture are used.

The training dataset of the present invention is generated by the training dataset producing method of the present invention. Further, the training dataset generation jig of the present invention is used in the training dataset generation method of the present invention, and as described above, is configured with an area to be a guide of placement position of the object and a visual marker to be fixed above the base, and the visual marker is associated with object information such as the object name of the object.

In the object recognition method and the position/posture estimation method of the present invention, machine learning is performed using a training dataset generated by the training dataset generating method of the present invention, a learned model is acquired, and a bounding box for recognition is created by detecting substance by image recognition from a newly captured image. And, a partial image cut out of the recognition bounding box is generated, and information of an object detected based on the generate partial image (an object name and so on, for example) and a posture are estimated. Furthermore, the position, the width and height of the recognition bounding box are acquired and the position in the 3rd. order coordinate of the real space regarding the detected substance is estimated.

Note that the position of the bounding box for recognition that surrounds the entire detected object may be the center of gravity of the surrounding bounding box. Further, the position of the detected object in the 3-dimensional coordinates of the real space may be the center of gravity position of the object.

In the object recognition and position/posture estimation method of the present invention, the recognition bounding box may be a 2-dimensional bounding box or a 3-dimensional bounding box.

In the object recognition and position/orientation estimation method of the present invention, the learned model specifically includes at least one of a classifier and a regressor for estimating the posture or position of the object. The estimated position may be the barycentric position of the object.

In the object recognition and position/posture estimation method of the present invention, the captured image is an image in which a plurality of objects are captured, and a bounding box for recognition is created for each detected object, and all detected objects are detected. Of the object, and the estimated posture and position are calculated as 3-dimensional coordinates in the real space.

With this, for each detected object, the estimated posture and position in 3-dimensional coordinates in the real space can be transmitted to the robot of the factory automation system. Further, for each detected object, the robot can accurately capture the object by estimating and calculating the posture and the position of the center of gravity in the 3-dimensional coordinates of the real space.

The captured image in the object recognition and position/posture estimation method of the present invention is preferably a captured image captured in an environment that is the same as or close to the generation environment of the training dataset. By using the captured image captured under the environment that is the same as or close to the environment for generating the training dataset, it is possible to improve the accuracy of object recognition and the estimation of the position and orientation.

The training dataset generation program of the present invention is a program for causing a computer to execute the following steps a) and b) which are a part of the processing of the training dataset generation method of the present invention.

a) A step for setting a bounding box of the object for the image group.
b) A step for generating a training dataset by associating the posture information of the object presumed from the captured image, the position information, the object information and the bounding box of the object.

The object recognition and position/posture estimation program of the present invention is a program for causing a computer to execute the following processes c) to e) which are part of the processes of the object recognition and position and orientation estimation method of the present invention.

c) A step for detecting the name of the object by image recognition from the newly captured image and creating a bounding box for recognition.
d) A step of generating a partial image in which the recognition bounding box is cut out, and estimating a posture of the detected object using a learned model based on the generated partial image.
e) A step for obtaining the position, width and height of the recognition bounding box, and using the learned model to estimate the position of the detected object in 3-dimensional coordinates in real space.

Note that the position of the recognition bounding box that surrounds the entire detected object may be the center of gravity of the bounding box that surrounds it. Further, the position of the detected object in the 3-dimensional coordinates in the real space may be the center of gravity of the object.

The training dataset generation device of the present invention includes the following 1) to 4).
1) A training dataset generation jig consisting of a base portion provided with an area that serves as a guide for the placement position of an object, and a visual marker fixed on said base portion and associated with object information of the object.
2) An imaging means for acquiring an image group of the entire object including visual markers in a state where the object is arranged with the area as a guide.
3) A means for acquiring the object information associated with the visual marker from an acquired image group.
4) A means for generating a reconstructed image group from an image group by concealing the area corresponding to the visual marker or the training dataset generation jig.
5) A means for setting a bounding box of the object for the acquired image group.
6) A means for generating a training dataset for object recognition and position posture estimation of a target object by associating pose information, position information, object information and bounding box information estimated from the captured image with an imaged image.

The training dataset generation device of the present invention is furnished with a means for generating a reconstructed image group by performing concealment processing of the region corresponding to a visual marker or a training dataset generation jig from the training dataset. The concealment means, from an image group, preferably consists of a detection means for detecting a region corresponding to a training dataset generation jig, an extracting means for extracting only a region corresponding to a training dataset generation jig by detecting an object region from a region wherein a reflected image extracted by a detection means, in an image group, preferably consists of overwrite means for overwriting as a background image or a noise image. Here, an extracting means may be to detect object region or may be to detect an object region using a learning model learned in advance.

Further, in order to prevent the training dataset generation jig from being reflected, it may be transparent except for the visual marker. Since the portion other than the visual marker of the training dataset generation jig is transparent, it is possible to prevent the training dataset generation jig from blocking the object in the captured image, and improve the accuracy of object recognition.

In the training dataset generating device of the present invention, it is preferable that the visual markers forming the training dataset generating jig are arranged so as to surround the area with the center point of the area as an upward direction. The visual marker is a 2-dimensional pattern marker including an AR marker or a 3-dimensional marker. Further, the base portion may be a circular, elliptical, or rectangular plate, or may be an L-shaped plate formed by bending and extending the plate. The bounding box may be a 2-dimensional bounding box or a 3-dimensional bounding box. The identification ID of the training dataset generation jig may be displayed in the area. In addition, an orientation adjustment guide for adjusting the orientation of the object may be provided in the area.

An industrial robot that completed machine learning using the training dataset generated by the training dataset generating method of the present invention, an industrial robot using an object recognition and position/posture estimation method and an industrial robot equipped with an object recognition and position/posture estimation program can be utilized for an automated system such as a sorting work and fabrication in food industries and logistic industries.

Effects of the Invention

According to the present invention, by making a plurality of substance as subjects, without requiring a plurality of sensors and a 3D model of the subject, by using a filmed image of an actual environment, a training dataset used for object recognition machine learning is efficiently produced, which can be used for high precision estimation of the position/posture and there are effects such as the invented product can be utilized for robot control used for automation system of a factory. Also, according to the present invention, there are effects such as a training dataset of higher quality can be produced by an ability that the visual marker group can be hidden.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
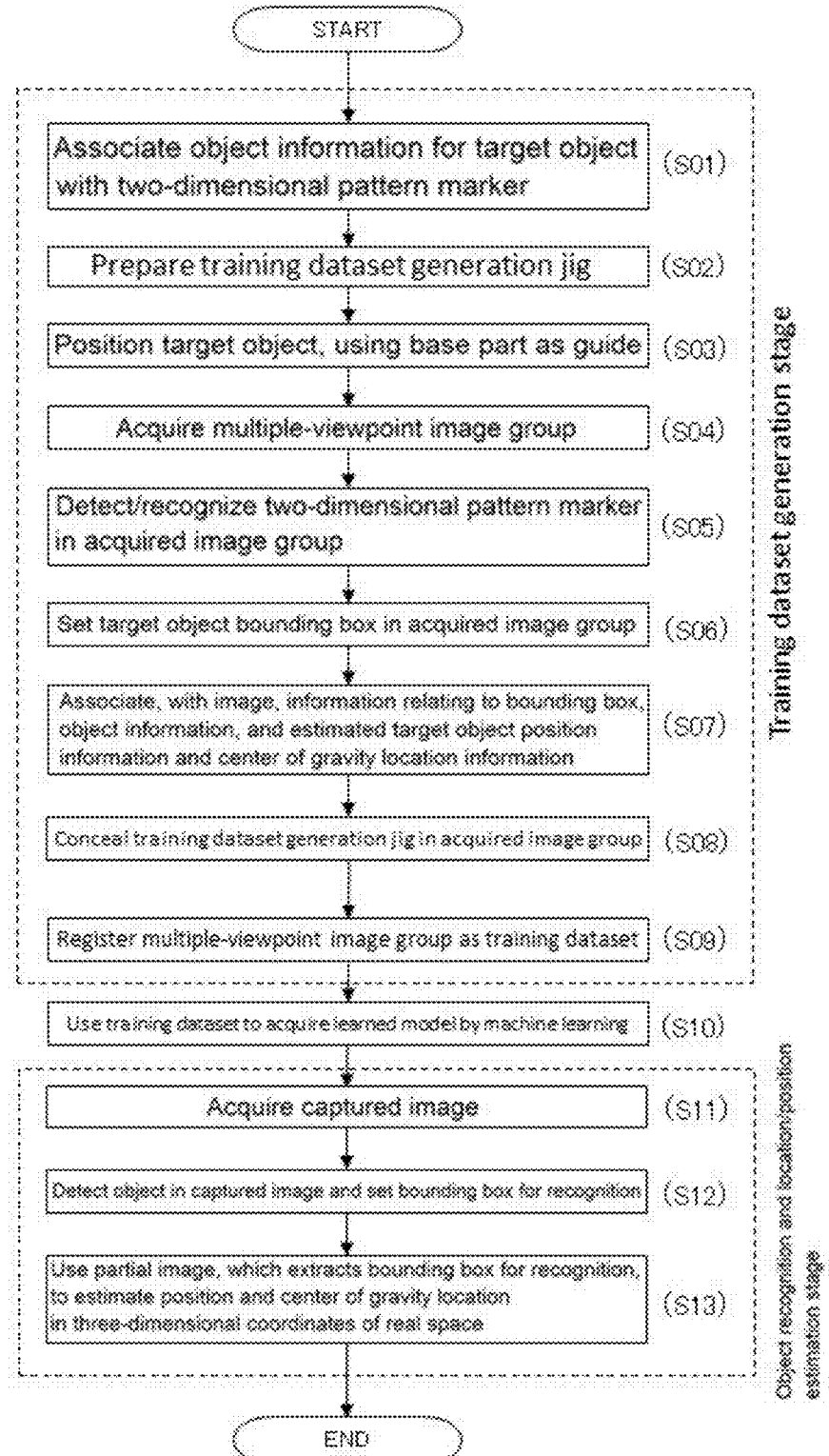
FIG. 1 shows a schematic flow of a training dataset generation process and a schematic flow of an object recognition and position/posture estimation process.

FIG. 1 shows a schematic flow of a training dataset generation process and a schematic flow of an object recognition and position/posture estimation process. As shown in FIG. 1, in the training dataset generation step, first, an AR marker (2-dimensional pattern marker) is used as a visual marker, and the object information of the object is associated with this AR marker (step S01). Next, a training dataset generation jig using the associated 2-dimensional pattern marker is prepared (step S02). An object is arranged by using the area of the training dataset generation jig as a guide (step S03). A multi-viewpoint image group of the object is acquired with the object placed (step S04). A 2-dimensional pattern marker is detected and recognized in the acquired image group (step S05). A bounding box that surrounds the entire object is set for the acquired image group (step S06). The estimated posture information of the object, the center of gravity position information, object information, and information about the bounding box are associated with the image (step S07). The training dataset generating jig including the AR marker is concealed regarding the acquired image group (step S08). Then, the multi-viewpoint image group is registered in the database as a training dataset (step S09).

Note that, in the setting of the bounding box in step S06 above, it is sufficient to surround the entire object as much as possible, and even if the object is not surrounded to some extent, it can be used as a training dataset. Even if the target object is hidden by another object, it does not matter if the target object is surrounded by the visible area.

Next, a learned model is acquired by machine learning such as deep learning using the registered training dataset (step S10).

Then, in the object recognition and position/posture estimation stage, first, a captured image is acquired (step S11), and an object in the captured image is detected by image recognition, and a bounding box for recognition is set (step S12). Note that the name of the object can be acquired when the object is detected and the object is recognized. The posture and the position of the center of gravity in the predefined reference coordinate system (3-dimensional coordinates in the real space) are estimated by using the partial image obtained by cutting out the bounding box for recognizing the object (step S13).

The reference coordinate system is defined by arranging visual markers in the position and orientation that you want to use as a reference.

Figure 2:
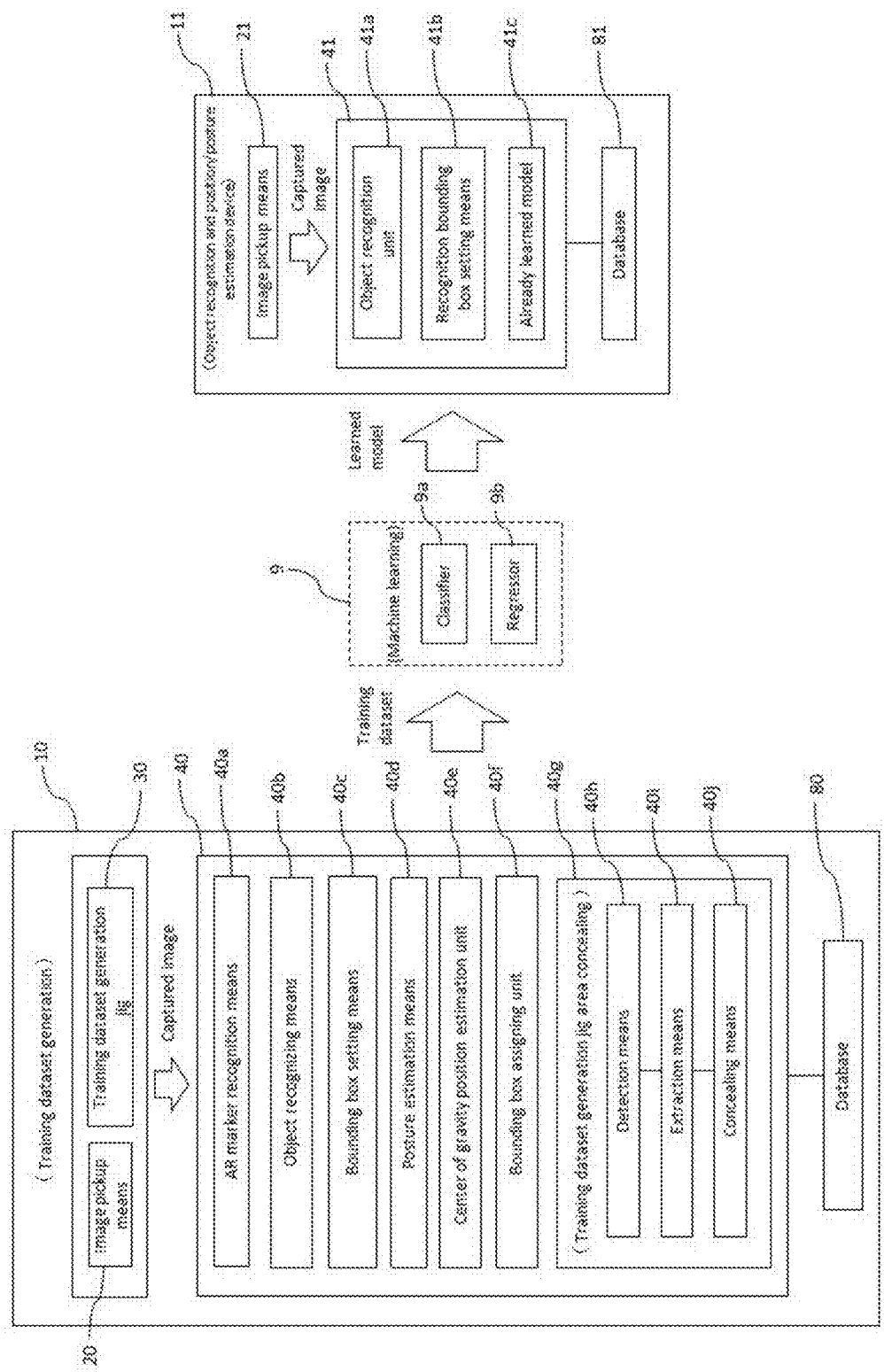
FIG. 2 shows a functional block diagram of a training dataset generation device, an object recognition and position/posture estimation device.

FIG. 2 shows a functional block diagram of a training dataset generation device, an object recognition and position/posture estimation device. As shown in FIG. 2, in the training dataset generation device 10, the image of the object is photographed using the imaging unit 20 and the training dataset generating jig 30. In the captured image, the AR marker is recognized by the computer 40 of the training dataset generation device 10 operating as the AR marker recognition means 40a. In the database 80, the AR marker and the object information of the object to be recognized are associated with each other in advance, and the computer 40 operates as the object recognition unit 40b to recognize the object information such as the object name of the object. The bounding box is set by the computer 40 operating as the bounding box setting means 40c based on the information obtained from the AR marker recognizing means 40a and the object recognizing means 40b. Further, the computer 40 operates as the target object posture estimation means 40d to estimate the posture of the target object. Further, the computer 40 operates as the center of gravity position estimation unit 40e, so that the center of gravity position of the object is estimated. The acquired information about the object and the information about the posture/center of gravity are assigned to the set bounding box by the computer 40 operating as the bounding box assigning unit 40f.

The training dataset generation jig 30 in the image is hidden from the captured image by the computer 40 operating as the training dataset generation jig region hiding means 40g. The training dataset generation jig area concealing means 40g consists of a detection means 40h for cutting out the region corresponding to the shape of the training dataset generation jig, the extraction means for further extracting only the region corresponding to the training dataset generation jig 40i and a concealing means 40j for performing overwrite processing to the image as a background image or noise image. The image subjected to the concealment processing by the training dataset generation jig area concealment means 40g is stored in the database 80 as a training dataset.

The training dataset prepares a classifier 9a and a regressor 9b by machine learning using the model generation computer 9, and obtains a learned model.

The generated learned model is used in the object recognition and position/posture estimation device 11. In the object recognition and position/posture estimation device 11, the image pickup means 21 photographs an object. In the obtained captured image, the computer 41 operates as the object recognition unit 41a, so that the object included in the image is detected and the object information such as the object name is acquired. Regarding the detected object, a bounding box for recognition is established by the computer 41 operating as a recognition bounding box setting means 41b. Once the bounding box for recognition is established, the posture and the center of gravity are presumed by the computer 41 to operate as the already learned model 41c for each recognition bounding box.

Note that the image pickup means 20 and the image pickup means 21, the computer 40 and the computer 41, or the storage means of the database 80 and the storage means of the database 81 may be configured to use the same device.

Generation of Training Dataset

Figure 3:
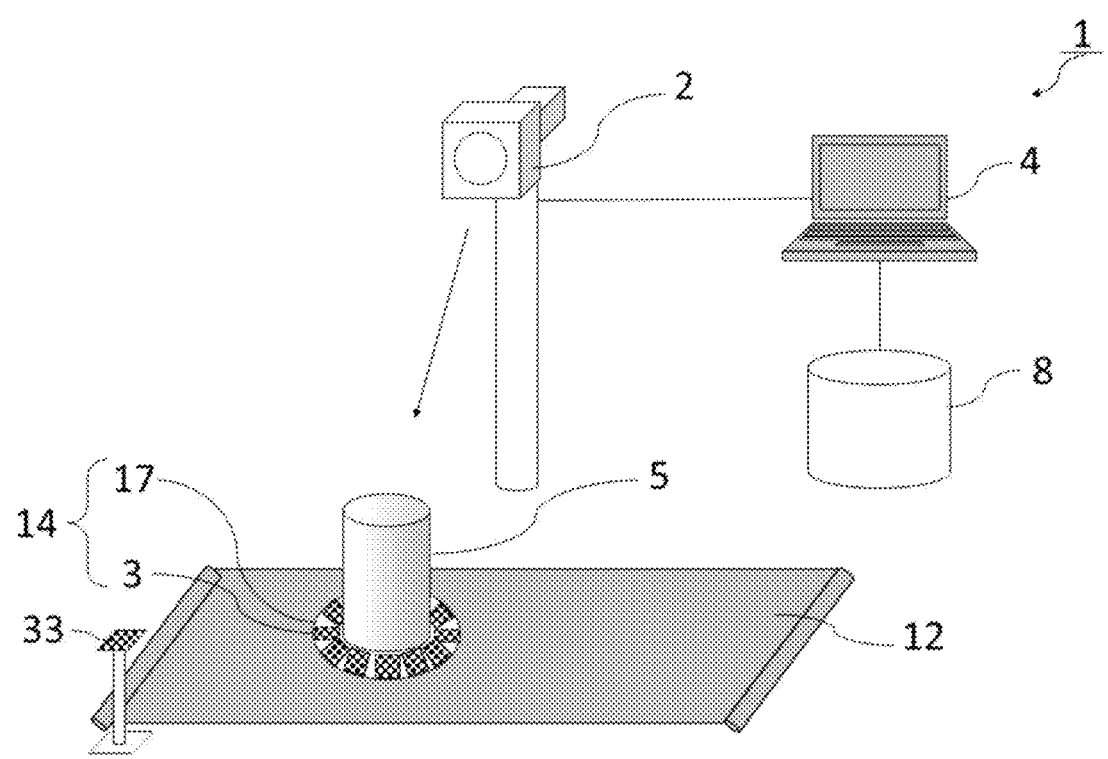
FIG. 3 shows a system configuration diagram when generating a training dataset.

FIG. 3 shows a system configuration diagram when generating a training dataset. As shown in FIG. 3, when preparing the training dataset, one camera 2, a plate 14, a reference marker 33, a belt conveyor 12 that moves the position of the plate 14 and the object 5 on the plate 14, and the computer 4 are used.

The plate 14 is composed of an AR marker 3 and a base portion 17, and the AR marker 3 is fixed on the base portion 17. Although not shown here, an area is provided in the base portion 17, and an object 5 to be recognized is arranged on the area. The image of the object 5 is taken by the camera 2 disposed above. The plate 14 may be individually manufactured according to the shape of the object 5, or a plate having a predetermined size may be used.

The reference marker 33 is arranged outside the belt conveyor 12 and is placed at a fixed position. The reference marker 33 is connected from the pedestal via a support, but this is to prevent the reference marker 33 from being hidden by the target object 5 during imaging. Therefore, the method of installing the reference marker 33 is not limited to such a method, and the same one as the plate 14 may be used. The reference coordinate system is defined by arranging the reference marker 33 at the position and orientation desired to be the reference.

The database 8 is provided in the computer 4, and the image group captured by the camera 2, the AR marker 3, and the position/orientation information regarding the object 5 are stored.

Figure 4:
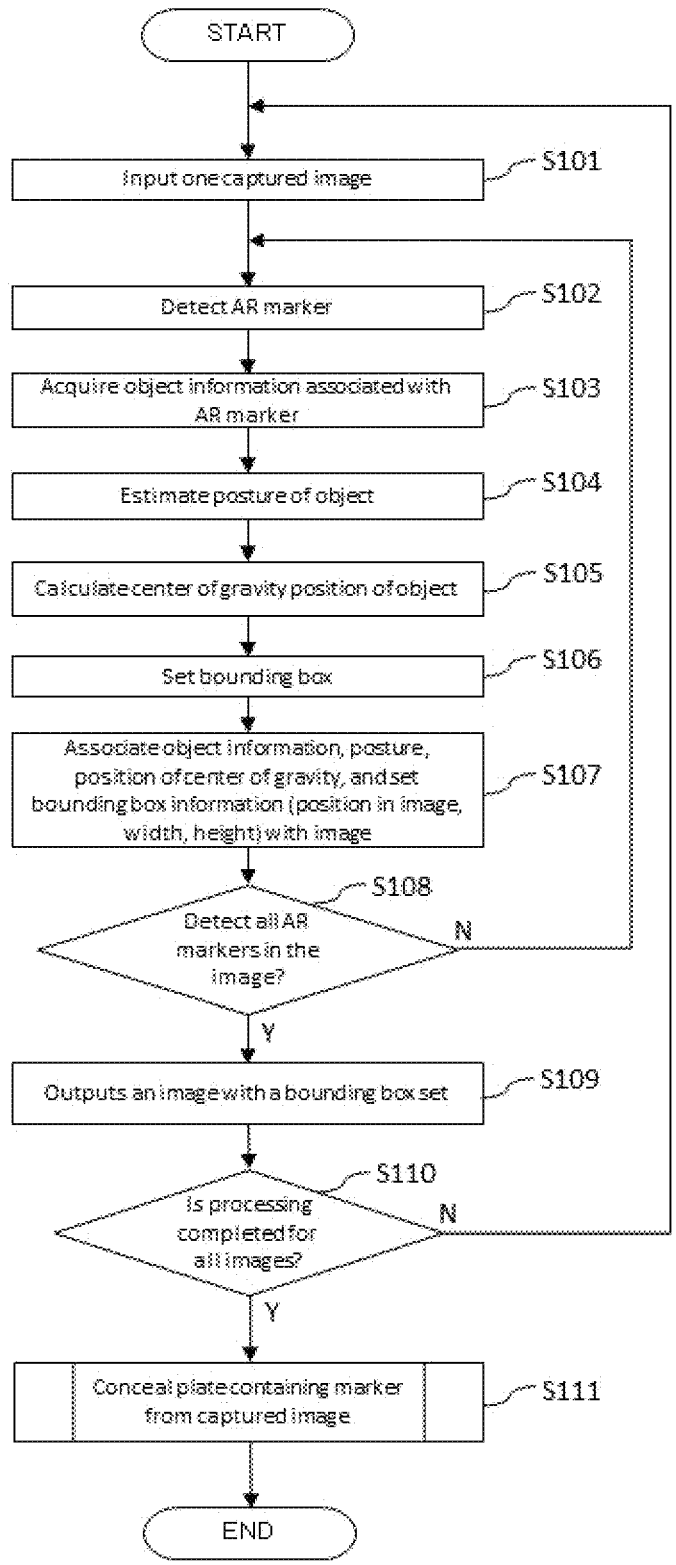
FIG. 4 illustrates a flow diagram of training dataset generation.

FIG. 4 illustrates a flow diagram of training dataset generation. As shown in FIG. 4, first, the camera 2 captures an image of the target object 5 placed on the base unit 17, and one captured image is input to the computer 4 (step S101). The computer 4 detects the AR marker included in the acquired image by image analysis (step S102). In the object information associated with the AR marker registered in the database 8, information for identifying the object such as a general name regarding the object is registered. Next, the object information associated with the AR marker is acquired from the database 8 (step S103). Information related to the size (size) of the target object is registered in the information associated with the AR marker registered in the database 8. The posture of the object is estimated based on the posture information of the AR marker (step S104). Further, the center of gravity position of the object is calculated (step S105). Here, the position of the center of gravity of the object is the position of the center of gravity calculated from the shape of the object and the placement on the training dataset generation jig, and the position (x, y, z) of the center of gravity of the object in the reference coordinate system. Calculate based on information. Regarding the calculation of the position of the center of gravity, in addition to the height of the object and the position and orientation of the object on the training dataset generation jig, the height of the object and the height of the tool on the training dataset generation jig are stored in advance as the object information. It is also possible to have the arrangement position and orientation of the AR marker and use them to calculate the position of the center of gravity of the object.

Then, a bounding box surrounding the object is set (step S106), and the object information, the posture, the position of the center of gravity, and the set bounding box information (position in the image, width, height) are related with the image (step S107). If there is an unprocessed AR marker in the image, the unprocessed AR marker is processed in the same manner. When all AR markers in the image have been processed (step S108), one image associated with the object information of the object, the posture/center of gravity position information, and the bounding box information is output (step S109). Images are photographed a plurality of times, and after the processing is completed for all the images (step S110), the plate including the marker is hidden from the captured image (step S111). This generates a training dataset.

Figure 5:
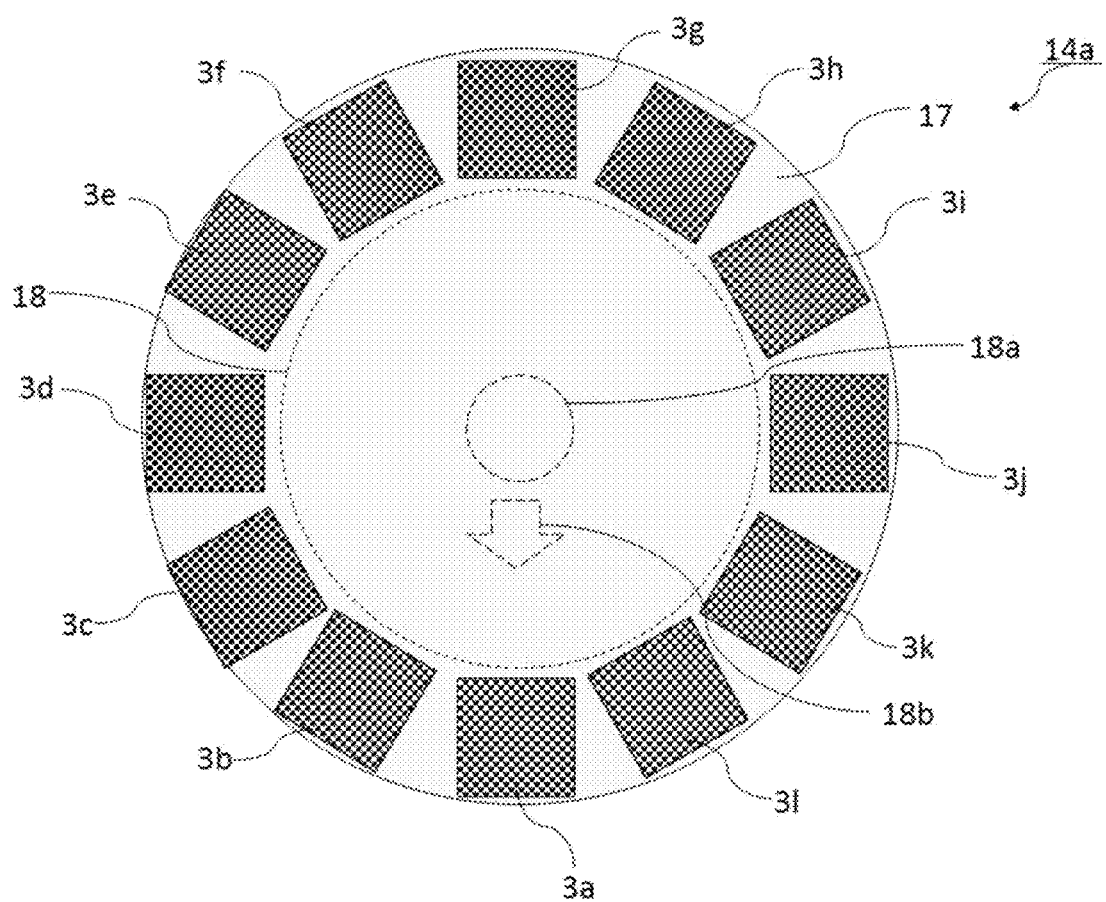
FIG. 5 shows a plan view of the training dataset generation jig of the Embodiment 1.

Here, the training dataset generation jig of the Embodiment 1 will be described by referencing FIG. 5~7. FIG. 5 shows a plan view of the training dataset generation jig of the Embodiment 1. As shown in FIG. 5, the plate 14a includes a base portion 17 and AR markers (3a~3l), and the base portion 17 is provided with an area 18 serving as a guide for placing the object 5. AR markers (3a~3l) are attached on the base portion 17 so as to surround the area 18. Here, the plate 14a is described as an example, but the plates (14b, 14c) described later have the same structure.

Figure 6:
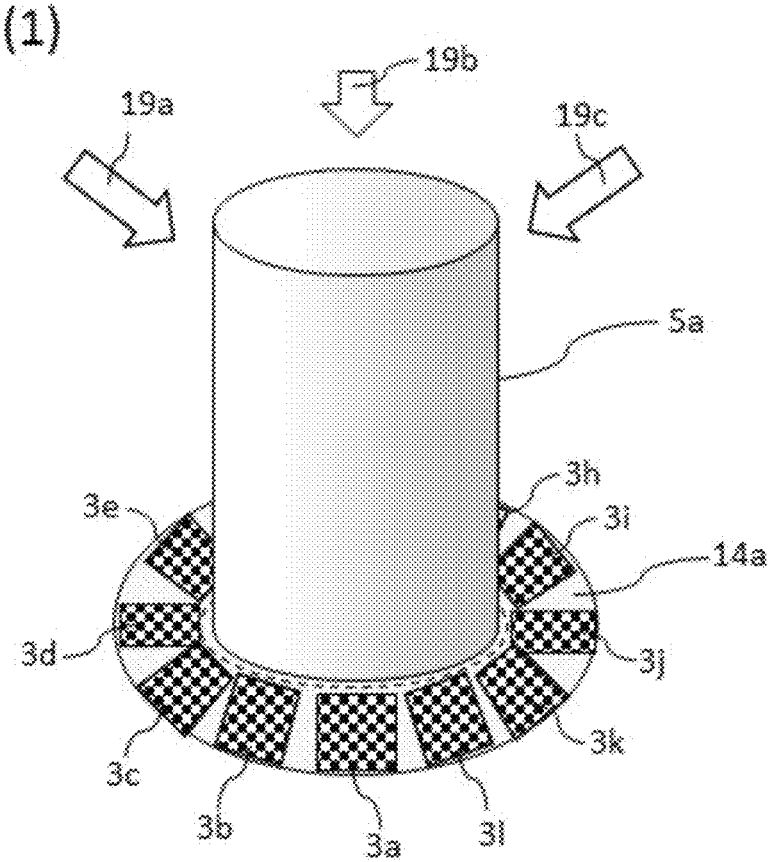
FIG. 6 is a photograph image view of the object of the Embodiment 1.
Figure 6:
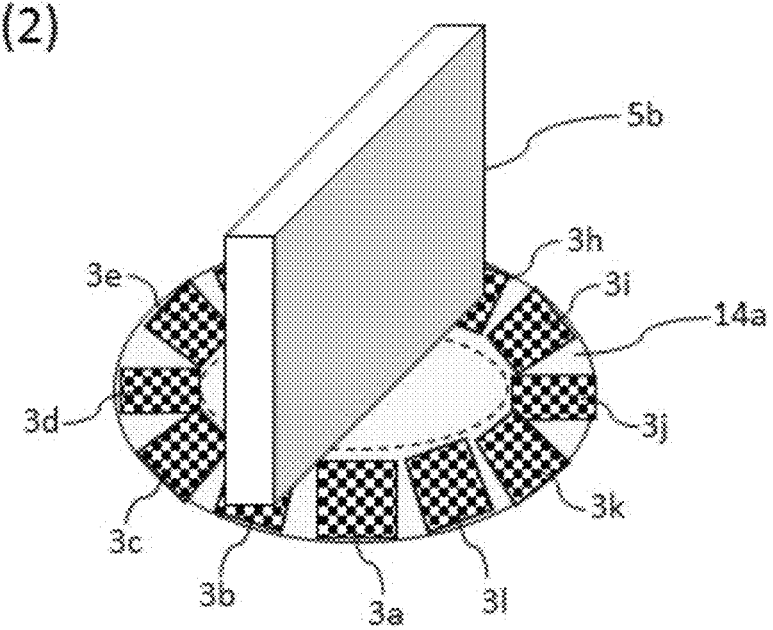

FIG. 6 is a photograph image view of the object of the Embodiment 1, where (1) shows a cylindrical shape and (2) shows a rectangular parallelepiped shape.

Placement of the object 5 in the area 18 is performed not only by placing it, but by fixing it to the area 18. And, since the area 18 serves as a guide for arranging the object 5, the bottom surface of the object may preferably be arranged so as to fit within the area 18, like the object 5a as shown in FIG. 6(1), however, this arrangement is not necessarily be a must and, for example, like the object 5b as shown in FIG. 6(2), the object may be placed with a partial protrusion.

In FIG. 6(2), the AR marker (3b, 3h) is hidden because the object 5b is arranged so as to partly protrude, but the AR markers (3a to 3l) are arranged in one shot. This is because it is not necessary that all AR markers be recognized, and at least one AR marker can be read.

As shown in FIG. 6(1), when the object 5a is placed on the plate 14a, the database 8 is previously registered with the information about the plate 14a and the information about the object 5a. Namely, in the database 8, in advance, the type/shape/number of AR markers disposed in a plate shape, in advance, the position/posture of each AR marker, the name of the object corresponding to the AR marker, and the long side (mm), the short side (mm), and height (mm) and the posture (deg) in the reference coordinate system are registered. Table 1 below shows an example of a database table. In Table 1, the object code is used as the identification code of the object and the marker code is the identification ID of the plate 14.

TABLE 1

| Object code | Marker code | Object long side [mm] | Object short side [mm] | Object height [mm] | Position of center of gravity in reference coordinate system (x, y, z) | Posture of object in reference coordinate [deg] |
|---|---|---|---|---|---|---|
| 1 | 3 | 100 | 50 | 100 | (20, 30, −150) | 0 |
| 2 | 2 | 200 | 150 | 10 | (10, 20, −30) | 0 |
| 3 | 1 | 300 | 250 | 50 | (12, 28, −80) | 10 |
| ... | ... | ... | ... | ... | ... | ... |

As shown in Table 1 above, regarding the object code 1, the marker code is 3, the object long side is 100 mm, the object short side is 50 mm, the object height is 100 mm, the position of the center of gravity in the reference coordinate system is x:10, y:20, z:−30, the posture of the object in the reference coordinate is registered as 0 (deg). Also, regarding the object code 2, the marker code is 2, the object long side is 200 mm, the object short side is 150 mm, the object height is 10 mm, the position of the center of gravity in the reference coordinate system x:10, y:20, z:−30, the posture of the object in the reference coordinate is 0(deg), Regarding the object code 3, the marker code is 1, the object long side is 300 mm, the object short side is 250 mm, the object height is 50 mm, the position of the center of gravity in the reference coordinate system is x:12, y:28, z:−80, the posture of the object in the reference coordinate is registered as 10(deg). Similarly, each data is registered for each object.

Therefore, when the AR marker 3 and the object 5a are photographed using the camera 2 in a state where the relative position and orientation relationship between the AR markers (3a~3l) and the object 5a is fixed, the computer 4 indicates that the type of the AR marker is any of the AR markers (3a~3l) by detecting any of the AR markers (3a~3l), and the information such as the position and the posture of the AR marker, and the name of the corresponding target object 5a is acquired. The number of AR markers to be detected may be one, but if two or more of the AR markers (3a~3l) can be detected, the information on the object 5a can be acquired more reliably.

Also, the posture of the target object 5a in the reference coordinate system is estimated from the relative position and posture relationship between the AR markers (3a~3l) and the target object 5a. Further, the centroid position of the object 5 in the reference coordinate system is estimated from the relationship of the relative positions between the AR markers (3a~3l) and the object 5a and the sizes of the object 5a and the plate 14.

Using the data about the size of the target object registered in the database 8 in advance, the bounding box surrounding the target object 5a is set based on the above estimated position and posture data.

By changing the angle for one object 5a and performing photographing a plurality of times, output images of a large number of patterns will be obtained. For example, as shown in FIG. 6(1), even when the relative position-posture relationship between the AR markers (3a~3l) and the object 5a is fixed, the case where the image is taken from the arrow 19a, or from the arrow 19b or 19c, the acquired image is different, for each case. As a method of photographing, in the present Embodiment, one camera 2 is fixed, and a plurality of times of photographing is performed while moving the plate 14 and the object 5a. In addition, while the plate 14 and the object 5a are fixed, one camera 2 may be moved to take an image, or a plurality of cameras may be used to take an image from different angles.

Figure 7:
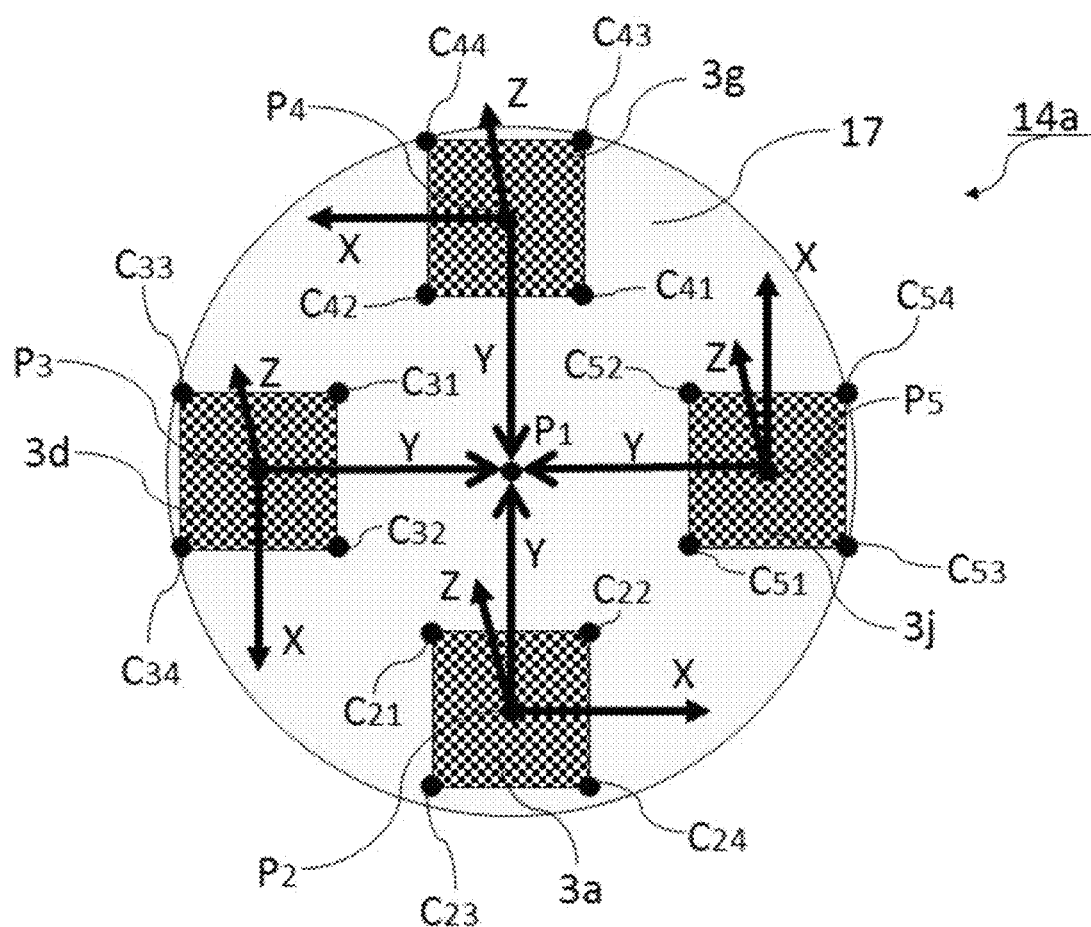
FIG. 7 shows an explanatory diagram of the arrangement of the AR markers of the Embodiment 1.

FIG. 7 shows an explanatory diagram of the arrangement of the AR markers of the Embodiment 1. In FIG. 7, all the AR markers (3a~3l) are not displayed, but only the AR markers (3a,3d,3g,3j) are displayed for convenience of description.

As shown in FIG. 7, the AR marker 3a is disposed from the center point $P_2$ of the AR marker 3a toward the center point $P_1$ of the base portion 17, namely, the upward direction is the Y-axis direction, and the right direction is the X-axis direction and the front direction becomes the Z-axis direction.

This also applies to the AR markers (3d, 3g, 3j). Namely, regarding the direction from the center point $P_3$ to the center point $P_1$ of the base portion 17 for the AR marker 3d, the direction from the center point $P_4$ to the center point $P_1$ of the base portion 17 for the AR marker 3g, and the direction from the center point $P_1$ to the center point $P_5$ to the AR marker 3j, are provided for each to be the Y-axis directions.

The positions and postures of the AR markers (3a, 3d, 3g, 3j) are estimated based on the position coordinates of the corners ($C_{21}$~$C_{24}$) in the case of the AR marker 3a, for example. Similarly, the position coordinates of the corners ($C_{31}$~$C_{34}$) is estimated for the AR marker 3d, the position coordinates of the corners ($C_{41}$~$C_{44}$) is estimated for the AR marker 3g, and the position coordinates of the corners ($C_{51}$~$C_{54}$) is estimated for the AR marker 3j, respectively.

The AR markers (3a, 3d, 3g, 3j) are provided in such a way that the direction of the center point $P_1$ of the base portion 17 from each center point becomes the Y-axis direction, so that the target object 5 is arranged by making the center point $P_1$ of the base portion 17 and when a multi viewpoint image group is acquired under a solidified state, the direction of the target object 5 can be easily presumed based on the direction of AR markers (3a~3l). However, for that purpose, it is necessary to devise in such a way that the object 5 is arranged at the center of the base portion 17.

Therefore, as shown in FIG. 5, the area 18 is provided with a position adjusting guide 18a. The position adjusting guide 18a indicates that the position adjusting guide 18a is substantially in the center of the area 18 and facilitates the position adjustment when the object 5 is placed.

If the object 5 to be placed on the area 18 is small, the object 5 is arranged so as to fit inside the position adjusting guide 18a, and if the object 5 is larger, the center of the object 5 becomes the position adjusting guide 18a. It can be arranged to abut.

Further, in the area 18, a guide 18b for orientation adjustment is provided. The orientation adjustment guide 18b is displayed in the shape of an arrow, and the front surface of the object 5 is arranged in the direction of the arrow. Although the training dataset can be generated without the orientation adjustment guide 18b, by a direction adjustment guide 18b being disposed and the direction of the object 5 being fixed and matched to the arrow, the management of acquired image becomes easy and manufacturing of a high-quality training dataset becomes possible.

Regarding the criterial to be set when the object 5 is disposed in the area 18 as mentioned above, because this criteria is set up to more efficiently perform machine learning such as deep learning, the criteria does not need to be strictly protected at the time of arrangement, in such a case wherein arrangement was performed in slightly oblique position, such data can be utilized in the subsequent machine learning.

Note that the area 18 is displayed in broken lines in FIGS. 5 and 6 for convenience of description, but is not actually displayed. This is because the role of the area 18 as a guide is that it can be inferred that the position where the object is placed can be inferred from the arrangement position of the AR markers (3a~3l) attached on the base portion 17. However, as another embodiment, it may be displayed by a broken line or the like.

Further, the area 18 may be configured to display the identification ID of the plate. For example, if a number or the like that can identify the plate is displayed near the center of the area 18 in which the position adjusting guide 18a is provided, there is little risk of being reflected in the captured image, and the plate is easily managed, improving convenience.

Figure 8:
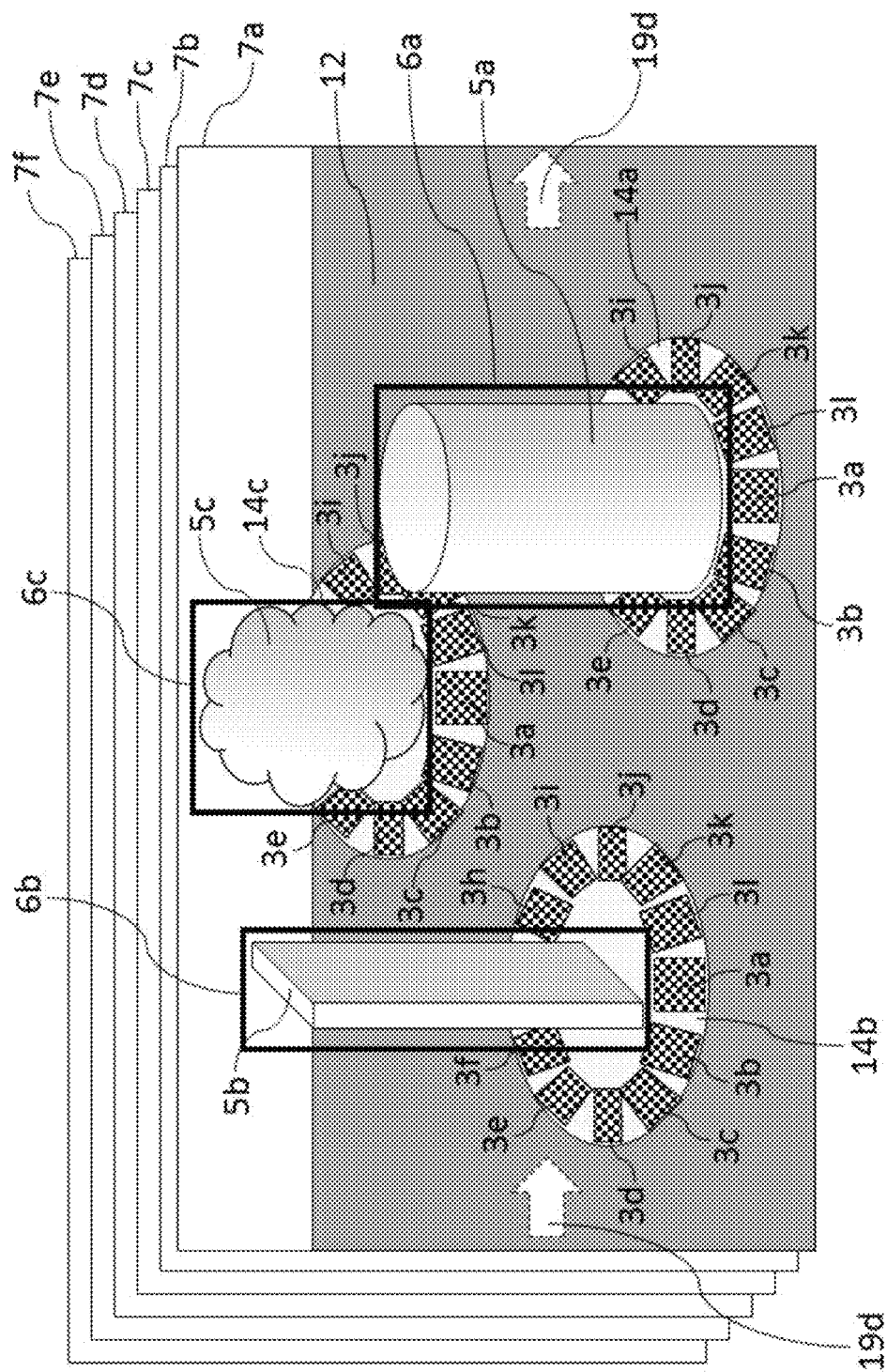
FIG. 8 shows an image diagram used in the generation of the training dataset of the Embodiment 1.

FIG. 8 shows an image diagram used in the generation of the training dataset of the Embodiment 1. The image 7a shown in FIG. 8 is a single image taken by the camera 2 shown in FIG. 2. As shown in FIG. 8, the image 7a displays a belt conveyor 12, the objects (5a~5c), the plates (14a~14c), and the bounding boxes (6a~6c). Here, the object 5a is a food product in a tubular container. Note that the object 5b is a food product in a paper container, and is placed in an upright state, but it may be placed in a lying state as shown in FIG. 6(2). The object 5c is food product packed in a soft resin container. Here, food is used as the object, but objects other than food may be applicable.

The object 5a is arranged on the plate 14a, the object 5b is arranged on the plate 14b, and the object 5c is arranged on the plate 14c.

The arrow 19d shows the direction in which a belt conveyor 12 flows, and the image 7a is taken while belt conveyor 12 is flowing in the direction of the arrow 19d. In the image 7a, objects other than the above are not displayed, but an object such as another device may be placed in the background and reflected in the background. The object (5a~5c) is photographed a plurality of times when it is flowed on the belt conveyor 12 one time. The AR markers (3a~3l) also move together with the objects (5a~5c) in a state where their relative positions and postures with respect to the objects (5a~5c) are fixed, and thus the AR markers (3a~3l) change their position and posture.

In addition, the same object may be installed in any orientation and imaged by the camera 2. Images of various patterns can be obtained by photographing a plural number of times when an object is flowed on the belt conveyor 12 for one time, or by installing the same object in all direction and taking image with the camera 2, and generation of models of higher precision becomes possible by machine learning such as deep learning at a later time.

When the image is captured by the method as described above, image data is acquired in the image 7a shown in FIG.

8, and the type and position/posture of AR markers (3a~3l) are detected, for each plate (14a~14c) first from each image. With regard to the AR markers (3a~3l), previously, for each plate (14a~14c), the name of the object, the long side (mm), the short side (mm), the height (mm), and the posture of the object in the reference coordinate are registered and the position and posture for each AR marker (3a~3l) are also registered. Accordingly, if at least one of the AR markers (3a~3l) is detected, the name of the object, the long side (mm), the short side (mm), the height (mm), and the posture of the object (deg) are acquired. Further, if two or more AR makers are detected, the object can be recognized with higher accuracy.

Regarding the object 5a, among the AR markers (3a~3l) provided on the plate 14a, the AR markers (3f to 3h) are not imaged in the image 7a, but the AR markers (3a~3e, 3i~3l) are imaged.

Regarding the object 5b, among the AR markers (3a~3l) provided on the plate 14b, the AR marker 3g is not imaged in the image 7a, but the AR markers (3a~3f, 3h~3l) are imaged.

Regarding the object 5c, among the AR markers (3a~3l) provided on the plate 14c, the AR markers (3f~3h) are not imaged in the image 7a, and regarding the AR markers (3j, 3k), although only a small portion of them is imagined, the AR markers (3a~3e, 3i, 3l) are also, although only some of them are imaged, the AR markers (3a~3e, 3i, 3l) are imaged.

Therefore, regarding the object 5b, the name and the like of the object 5b are acquired by detecting the AR markers (3a~3f, 3h~3l) provided on the plate 14b. Similarly, by detecting the AR markers (3a~3e, 3i~3l) provided on the plate 14c, the name of the object 5c is acquired, and by the detection of AR markers (3a~3e, 3i~3l) provided on the plate 14a, the name or the like of the target object 5a is acquired.

Estimate the position and posture information of the object (5a-5c) based on the position and posture information defined in the AR markers (3a~3l) for each plate (14a~14c).

Specifically, first, the posture of the object 5b is calculated based on the posture information defined by the AR markers (3a~3f, 3h~3l) provided on the plate 14b. Similarly, the posture of the object 5c is calculated based on the posture information defined in the AR markers (3a~3e, 3i~3l) provided on the plate 14c, and the posture of the object 5a is calculated based on the posture information defined by the AR markers (3a~3e, 3i~3l) provided on the plate 14a.

Next, based on relative the positional information defined by the AR markers (3a~3f, 3h~3l) provided on the plate 14b, and the information of the relative positional relationship AR markers (3a~3f, 3h~3l) provided on the plate 14b and the target object, the position of the center of gravity of the object 5b is calculated. Similarly, the center of gravity 5a of the object 5c is calculated based on information on the relative positional relationship between the positional information defined at AR marker (3a~3e, 3i, 3l) provided on the plate 14c and on the information of the relative positional relationship between AR markers (3a~3e, 3i, 3l) provided on the plate 14c and the target 5a. Similarly, the center of gravity 5a of the object 5c is calculated based on information on the relative positional relationship between the positional information defined at AR marker (3a-3e, 3i~3l) provided on the plate 14a and on the information of the relative positional relationship between AR markers (3a~3e, 3i~3l) provided on the plate 14a and the target 5a.

Using the above calculated data and the data regarding the size of the object (5a~5c), a bounding box (6a~6c) surrounding the object (5a~5c) is generated. Here, for example, the bounding boxes (6a, 6c) surrounding the objects (5a, 5c) are overlapped, but since the bounding boxes are to only hold the coordinate data, there is no problem even if they overlap.

Figure 9:
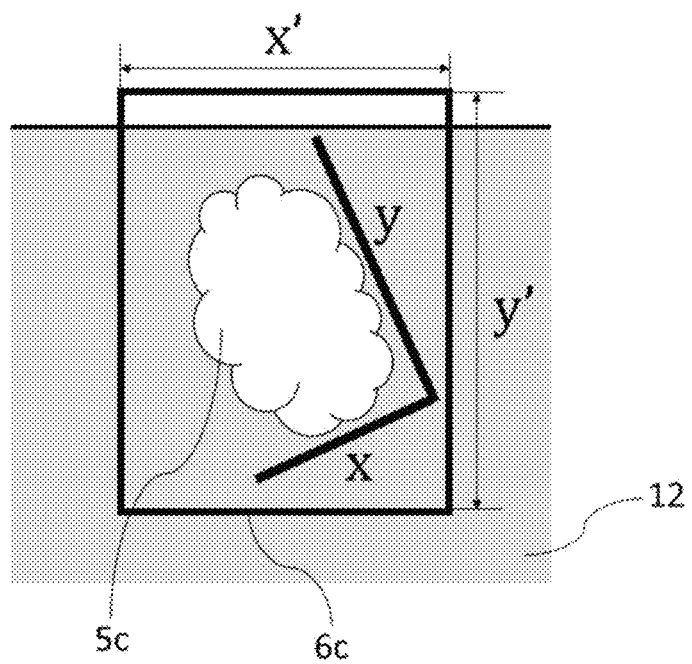
FIG. 9 is an explanatory diagram of a 2-dimensional bounding box setting.

As described above, a method of setting the bounding boxes (6a~6c) on the objects (5a~5c) will be described with reference to FIG. 9. FIG. 9 is an explanatory diagram of a 2-dimensional bounding box setting. In FIG. 9, the bounding box 6c being set in the object 5c in the image 7a in FIG. 8 will be described as an example. Here, for convenience of explanation, it is assumed that the object 5c is slightly tilted to the left, unlike the object 5c arrangement form in FIG. 12.

As shown in FIG. 9, the object 5c is recognized as a rectangle, and for example, as shown in Equation 1 below, offsets that serve as margins are added to the width (x') and height (y') of the rectangle (quadrangle), respectively. Then, determine the width and height of the bounding box, and set the bounding box. Here, h is the height of the object, and φ is the installation angle of the camera with respect to the vertical direction.

$$x' = x \cos \theta + y \sin \theta$$

$$y' = y \cos \theta + x \sin \theta + h \sin \varphi \qquad \text{[Equation 1]}$$

As shown in FIG. 9, when setting the bounding box 6c, since the above offset is provided, the area is provided wider than the bounding box calculated by the above equation 1.

In FIG. 8, although the image 7a is used as an example, a plurality of images can be obtained as shown in the images (7b to 7f) by repeatedly taking pictures while operating the belt conveyor 12. The images to be acquired are not limited to the images (7a~7f), and a larger number of images are acquired.

About Concealment of Plates Containing AR Markers

When machine learning is performed using a data group in which the AR marker 3 in the plate 14 and the base portion 17 are reflected in the image as training data as a training dataset, for example, there is a risk that the model generation computer 9 learns the AR maker itself. If the model generation computer 9 learns the AR marker 3 itself, the quality of the training dataset deteriorates, so it is preferable to delete them from the training data such as the AR marker.

Figure 10:
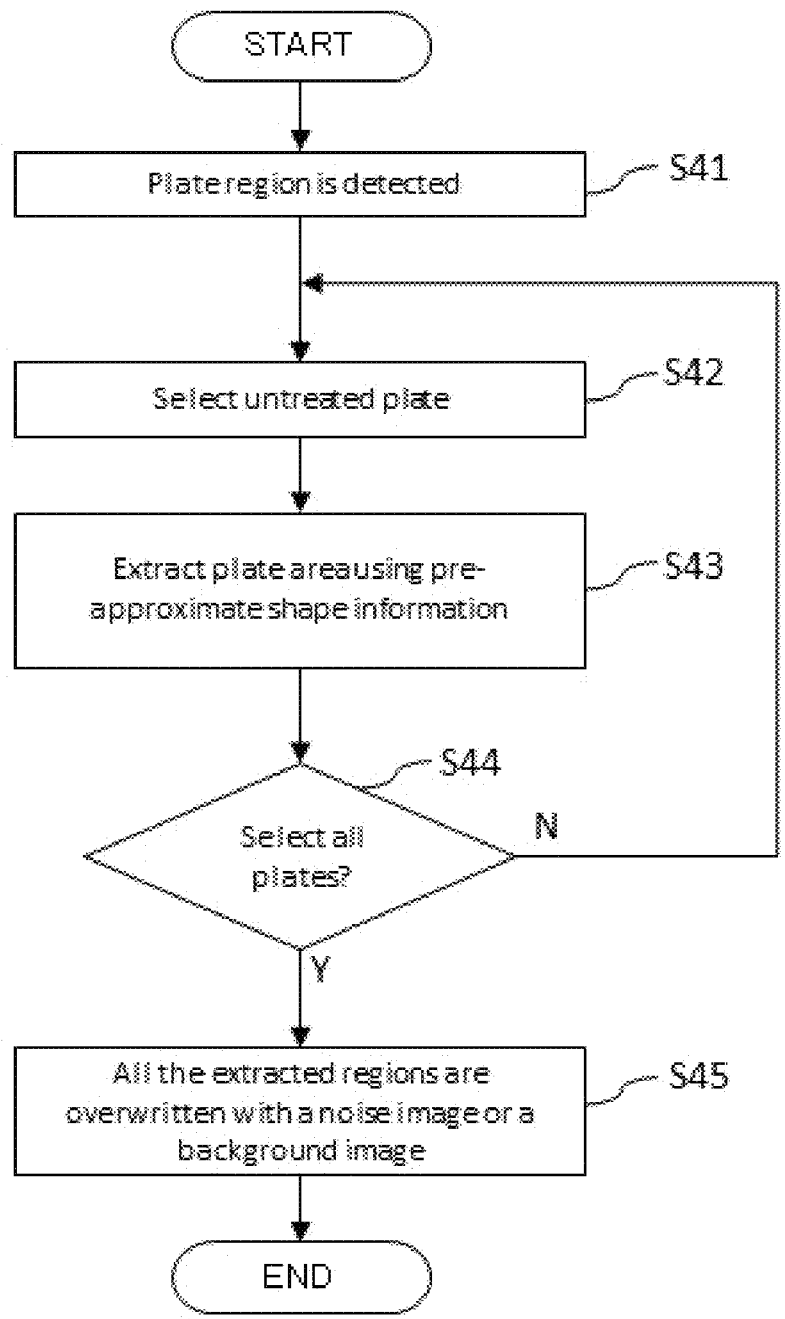
FIG. 10 shows a concealment flow diagram of the training dataset generation jig area.
Figure 12:
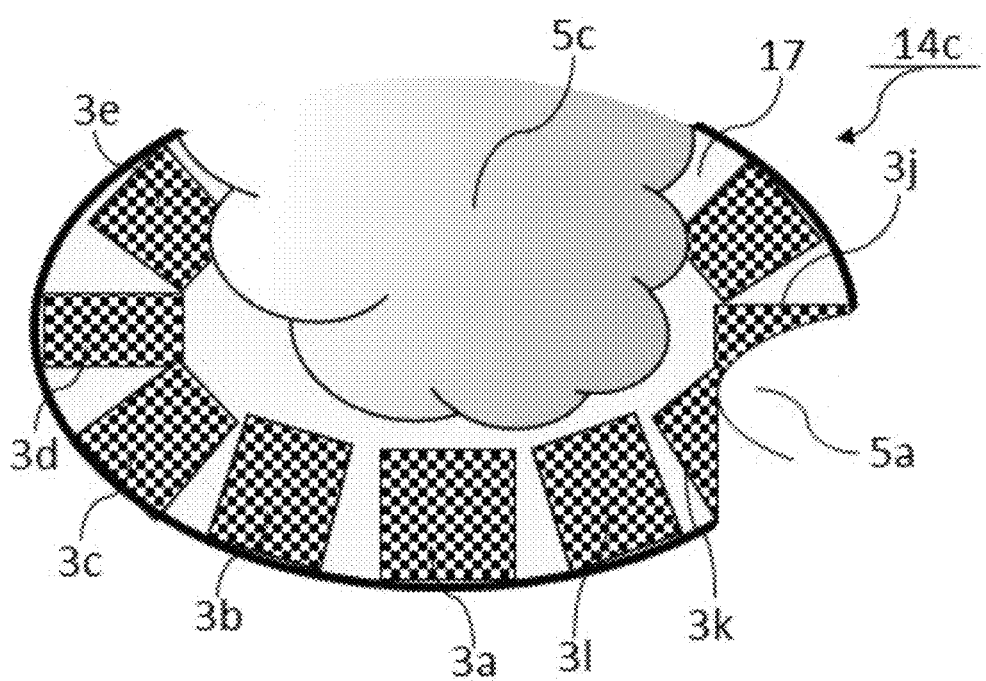
FIG. 12 shows explanatory diagram 2 of concealment of the training dataset generation jig area.
Figure 12:
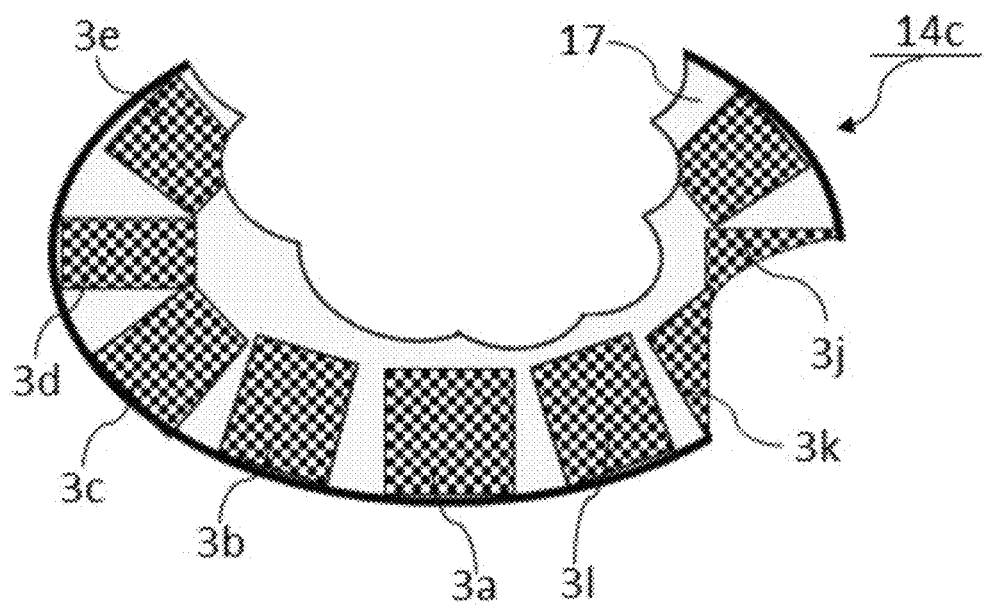
Figure 13:
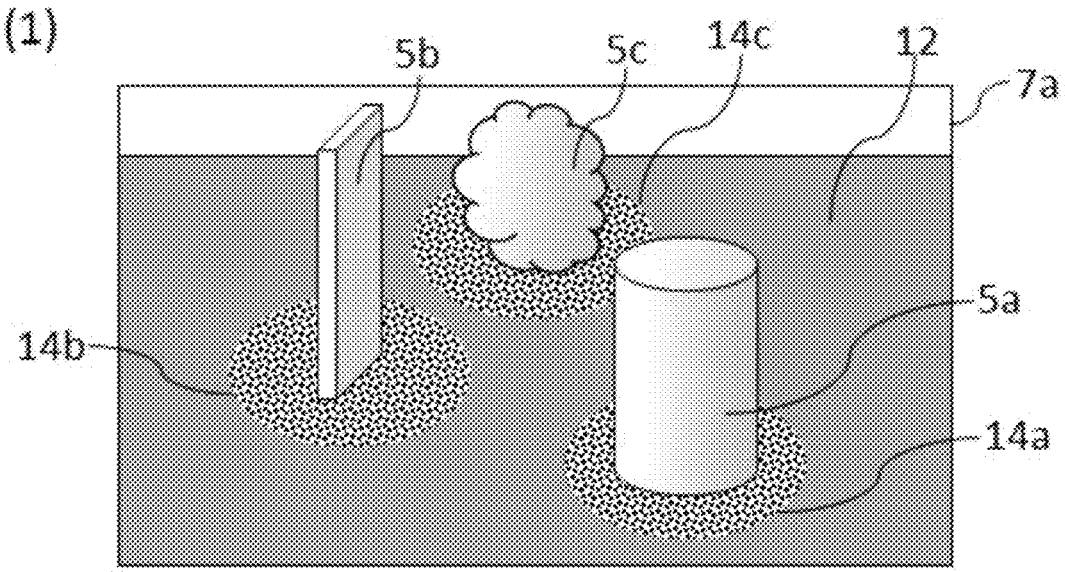
FIG. 13 shows explanatory diagram 3 of concealment of the training dataset generation jig area.
Figure 13:
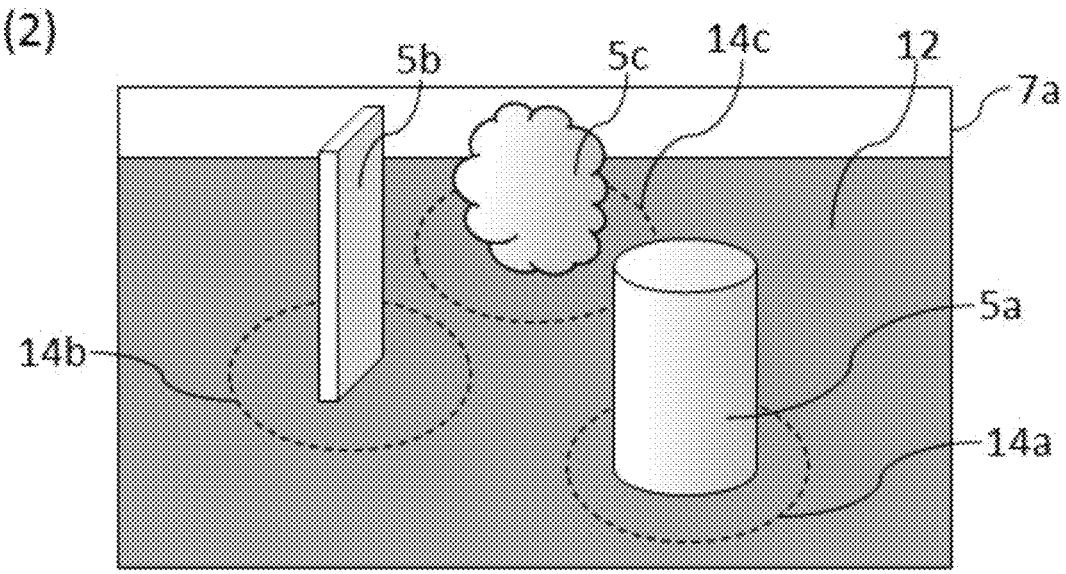

Therefore, a method of concealing the plate containing the AR marker will be described with reference to FIGS. 10 to 13. FIG. 10 shows a concealment flow diagram of the training dataset generation jig area. Also, FIGS. 11 to 13 show explanatory diagrams of concealment of the training dataset generation jig area.

Figure 11:
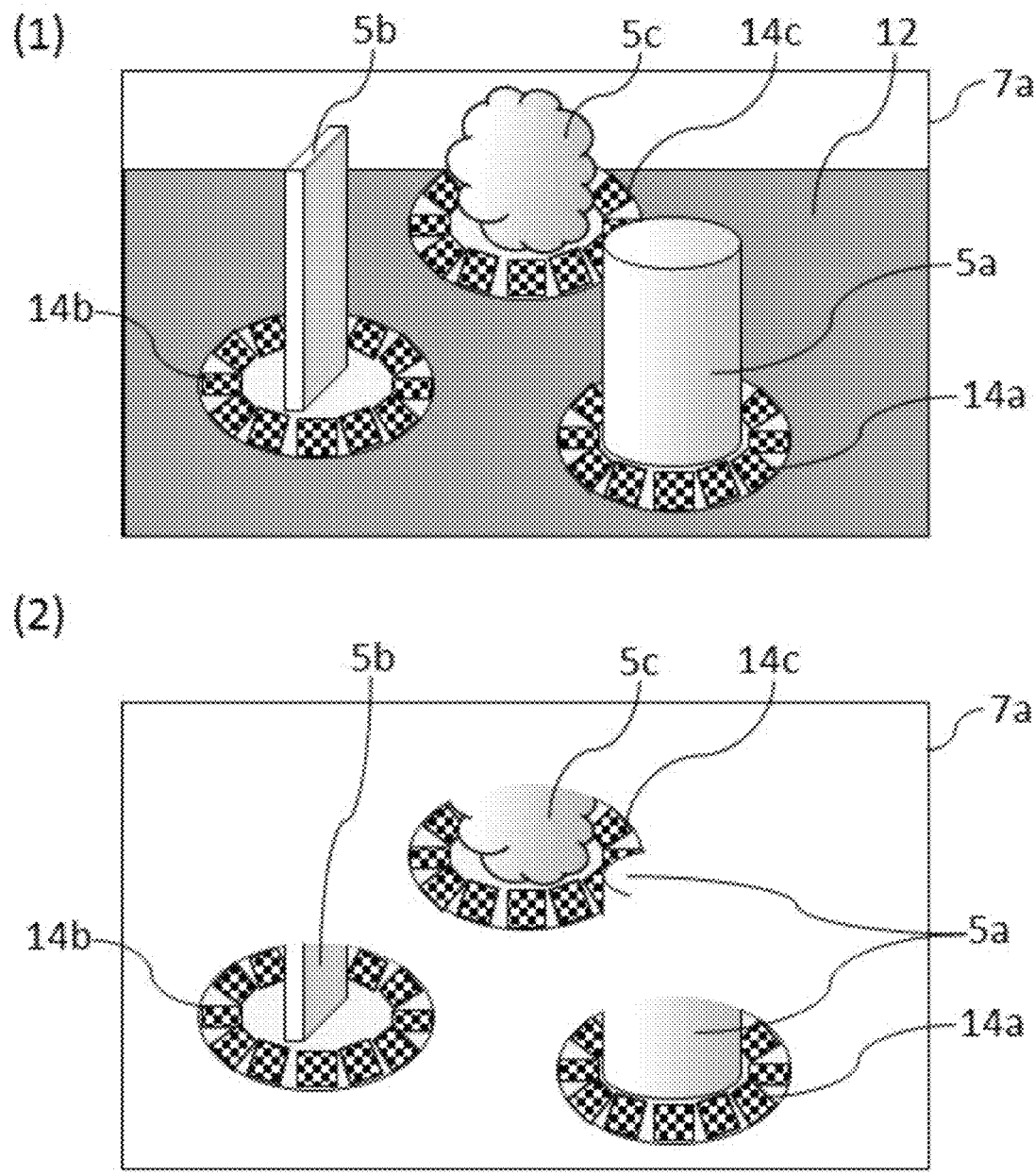
FIG. 11 shows explanatory diagram 1 of concealment of the training dataset generation jig area.

First, FIG. 11(1) shows the acquired image before concealment. As shown in FIG. 11(1), the object (5a~5c), the plate (14a~14c), and the belt conveyor 12 are displayed in the image 7a. From such an image 7a, as shown in FIG. 10, a plate region is detected (step S41).

FIG. 11(2) shows the acquired image after clipping. As shown in FIG. 11(2), in the image 7a, only the portion in the shape of the plate (14a to 14c) is cut out, and the objects (5a to 5c) of the shape outside of the belt conveyor 12 or the plate (14a to 14c) are cut out.

Next, one of the plate-shapes of the plates cut out (14a to 14c) is selected (step S42). FIG. 12(1) is a selected plate 14c from the image 7a shown in FIG. 11(2).

Figure 27:
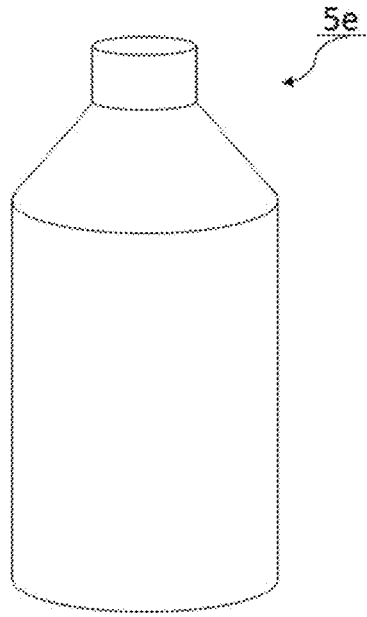
FIG. 27 is an explanatory diagram of a method of hiding an object.
Figure 27:
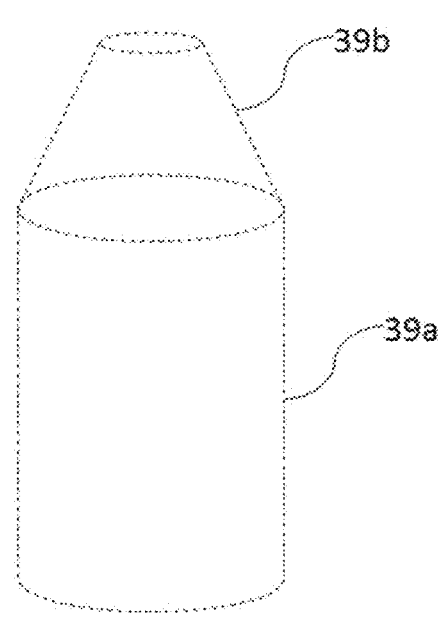

Here, using the shape information approximated in advance, only the region corresponding to the training dataset generation jig is further extracted from the region extracted by the detection means 40h (step S43). FIG. 27 is an explanatory diagram of a method of hiding an object, wherein (1) shows an object and (2) shows an approximated shape. The object 5e shown in FIG. 27(1) is a PET bottle, and as a shape similar to the object 5e, for example, as shown in FIG. 27(2), a shape combining the cylindrical shape 39a and the truncated cone shape 39b are combined can be utilized.

Note that, instead of using shape information that is approximated in advance, a learning model that has been trained in advance, such as extracting a plate region with a model based on a mixed Gaussian distribution (GMM) that has been trained in advance, may be used to extract only the area corresponding to the training dataset generation jig.

FIG. 12(2) shows an image after extracting the plate region. As shown in FIG. 12(2), from the image shown in FIG. 12(1), the portion where the object 5a and the object 5c are reflected is erased, and only the plate 14c remains.

If there is an untreated plate, the untreated plate is selected (step S42), and the same treatment as for the plate 14c is performed. In this embodiment, the same treatment is performed on the plates (14a, 14b). After processing all the plates (step S44), all the extracted regions are overwritten with a noise image or a background image (step S45).

FIG. 13(1) is an image of the Embodiment 1 after the concealment processing. In this embodiment, the area corresponding to the plates (14a to 14c) is overwritten with a noise image. On the other hand, FIG. 13(2) shows the background image overwritten. For convenience, the area corresponding to the plate (14a to 14c) is represented by a broken line, but it is not actually displayed.

As shown in FIG. 13(2), it seems that overwriting display with the background image is more natural as a concealment processing. However, since the noise image as shown in FIG. 13(1) is updated with a certain constant probability distribution and a different noise image is generated each time, there is an advantage that training by machine learning is difficult to perform. Therefore, it is suitable for solving the problem once training plates and AR markers is completed.

Figure 14:
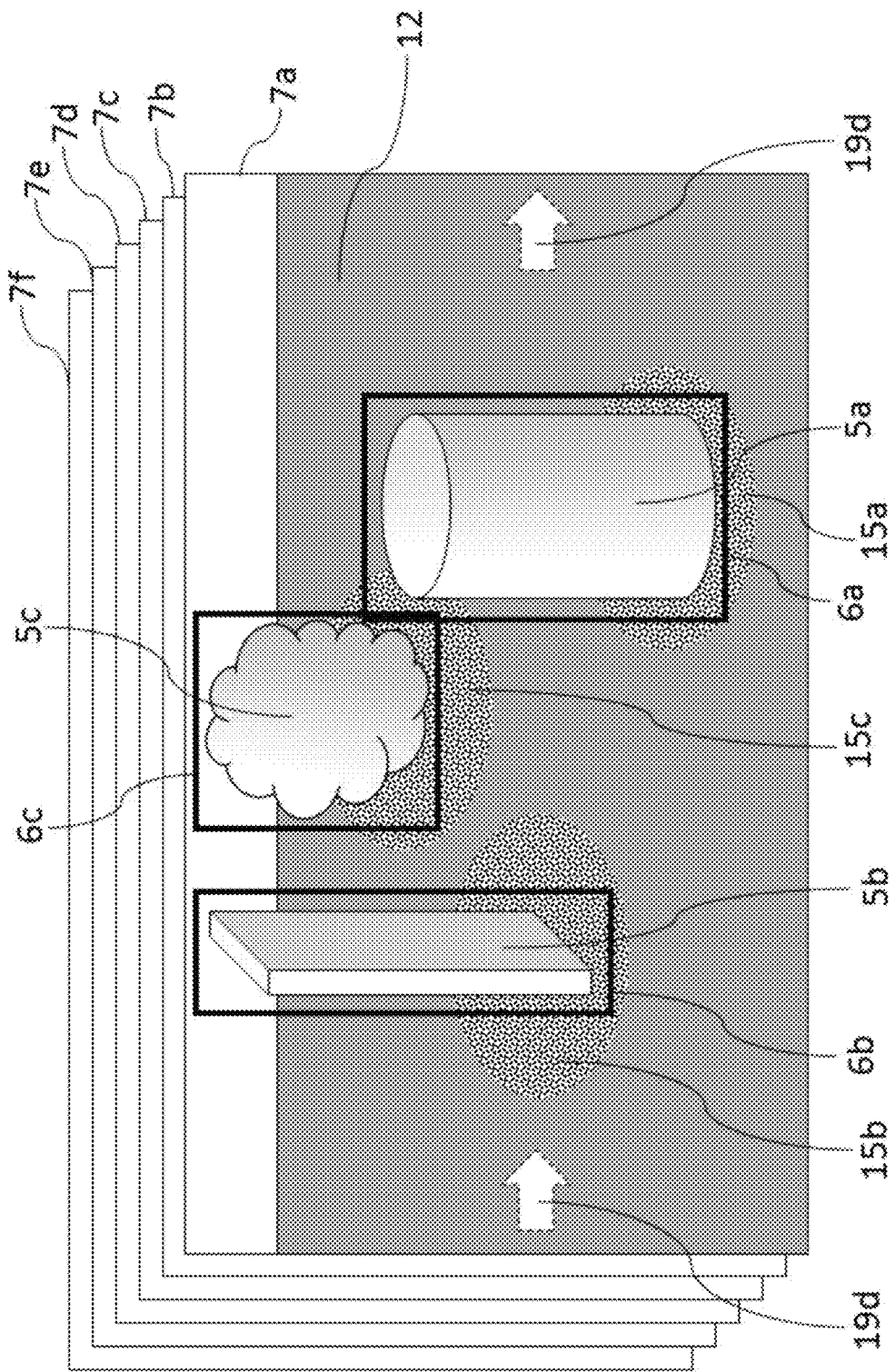
FIG. 14 shows a conceptual image diagram after concealing the training dataset generation jig area.

FIG. 14 shows a conceptual image diagram after concealing the training dataset generation jig area. As shown in FIG. 14, the image 7a shows the belt conveyor 12, the objects (5a to 5c), the concealing portions (15a to 15c), and the bounding boxes (6a to 6c).

Bounding boxes (6a to 6c) are set for each of the objects (5a to 5c), but as described above, these are not to be processed into an actual image.

Further, the plates (14a to 14c) shown in FIG. 8 are concealed by a noise image to form concealing portions (15a to 15c).

Here, the images (7a to 7f) are illustrated, but in reality, a larger number of images are taken. In this way, a training dataset is generated by accumulating images such as the image 7a wherein the bounding boxes (6a to 6c) are inserted and the plates (14a to 14c) are concealed.

About Machine Learning

After the training dataset is generated, when the training dataset is used for specific robot control, machine learning such as deep learning using the training dataset is required in advance. Therefore, the computer 4 uses the training dataset stored in the database 8 to perform deep learning on the object to be estimated, and acquires a trained model.

Figure 15:
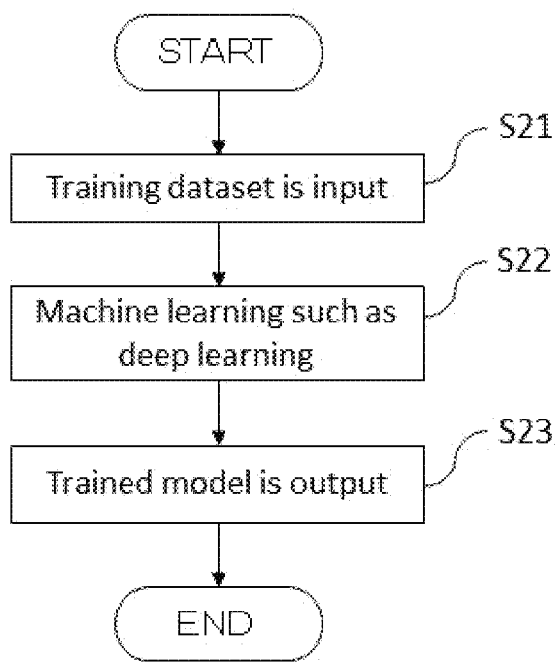
FIG. 15 shows a flow diagram of trained model generation.

FIG. 15 shows a flow diagram of trained model generation. As shown in FIG. 15, first, the training dataset is input (step S21). Deep learning is performed based on the input training dataset (step S22). In this Embodiment, deep learning is performed using TensorFlow (registered trademark), which is an artificial intelligence software library developed by Google (registered trademark) and released as open source. The trained model obtained by deep learning is output (step S23).

About Object Recognition and Position/Posture Estimation

Figure 16:
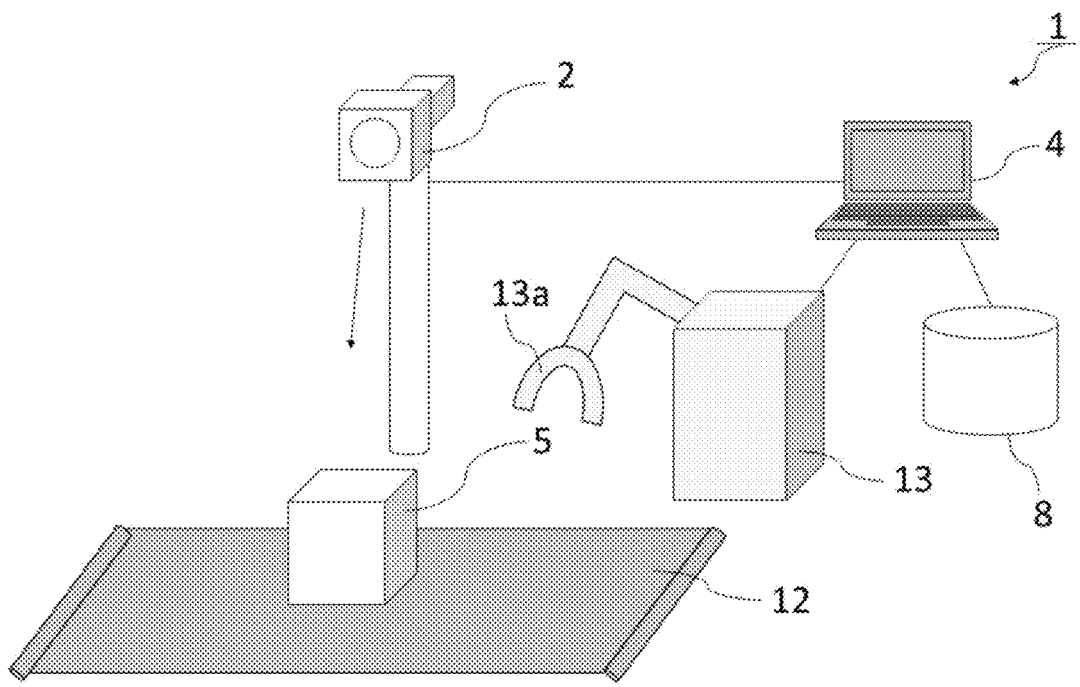
FIG. 16 shows a system configuration diagram of a robot control system at the time of object recognition and position/posture estimation.

FIG. 16 shows a system configuration diagram of a robot control system at the time of object recognition and position/posture estimation. As shown in FIG. 16, at the time of object recognition and position/posture estimation, the robot control system 1 consists of a camera 2, a computer 4, and a robot 13.

An object 5 to be recognized is arranged on the belt conveyor 12. A database 8 is provided in the computer 4, and images and such taken by the camera 2 are stored. The robot 13 is provided with a robot arm 13a, and has a structure in which an object can be gripped by the robot arm 13a.

Figure 17:
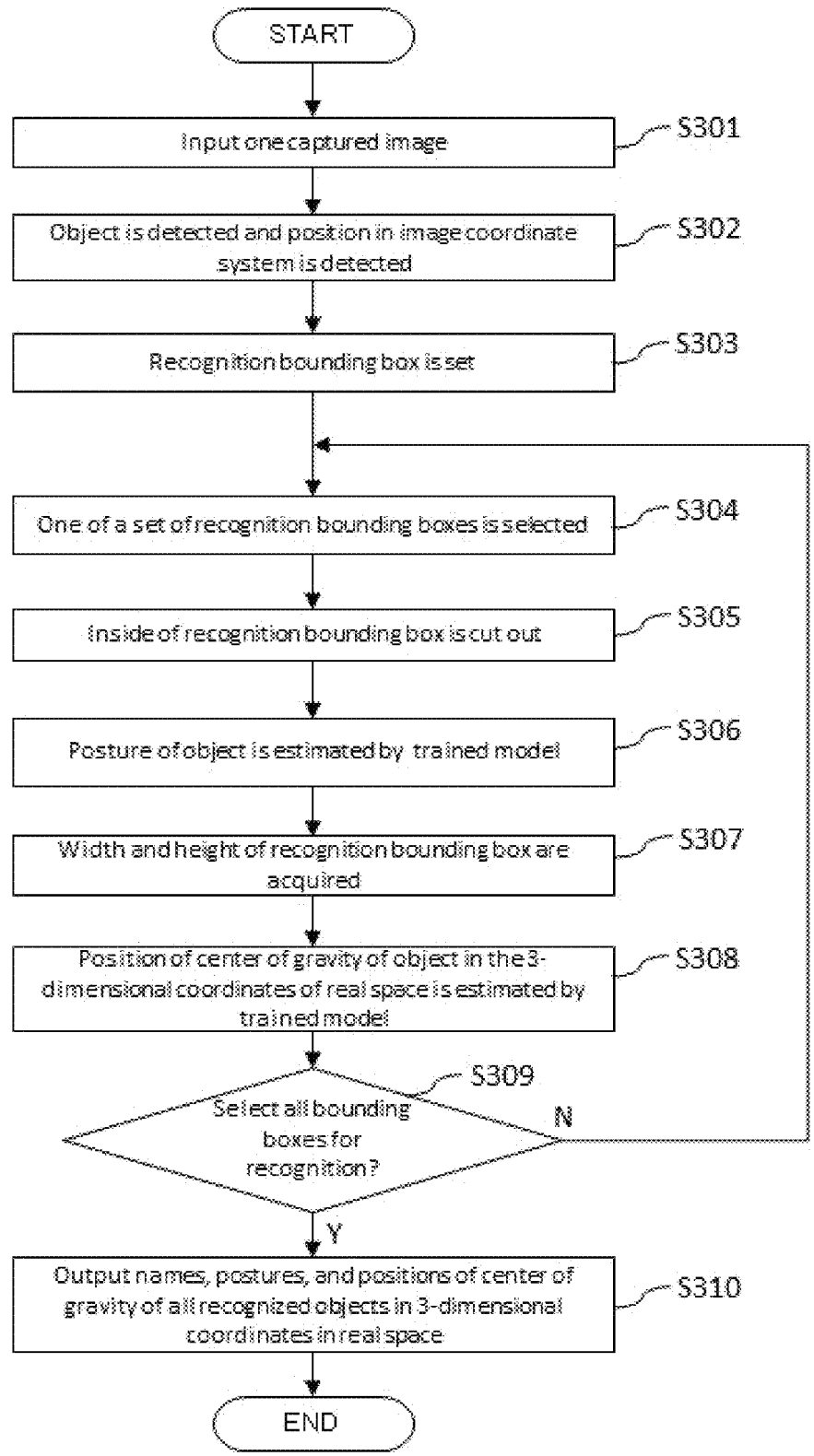
FIG. 17 shows an object recognition and position/posture estimation flow diagram.

FIG. 17 shows an object recognition and position/posture estimation flow diagram. As shown in FIG. 17, the camera 2 is used to take a picture on the belt conveyor 12 and input one captured image (step S301). By image recognition, an object is detected and a position in the image coordinate system is detected (step S302). Here, object information (name, etc.) is acquired. Further, the recognition bounding box is set (step S303). One of a set of recognition bounding boxes is selected (step S304). The inside of the recognition bounding box is cut out from the captured image (step S305). Then, the posture of the object is estimated by using the classifier of the trained model obtained by machine learning such as deep learning (step S306). Next, the width and height of the recognition bounding box are acquired (step S307), and the position of the center of gravity of the object in the 3-dimensional coordinates of the real space is estimated by the regression device of the trained model (step S308). It is determined whether or not there is an unselected bounding box for recognition (step S309), and if there is an unselected bounding box for recognition, one of them is selected. When all the recognition bounding boxes have been selected, the names, the postures, and positions of the center of gravity of all the detected objects in the 3-dimensional coordinates of the real space are output (step S310).

Figure 18:
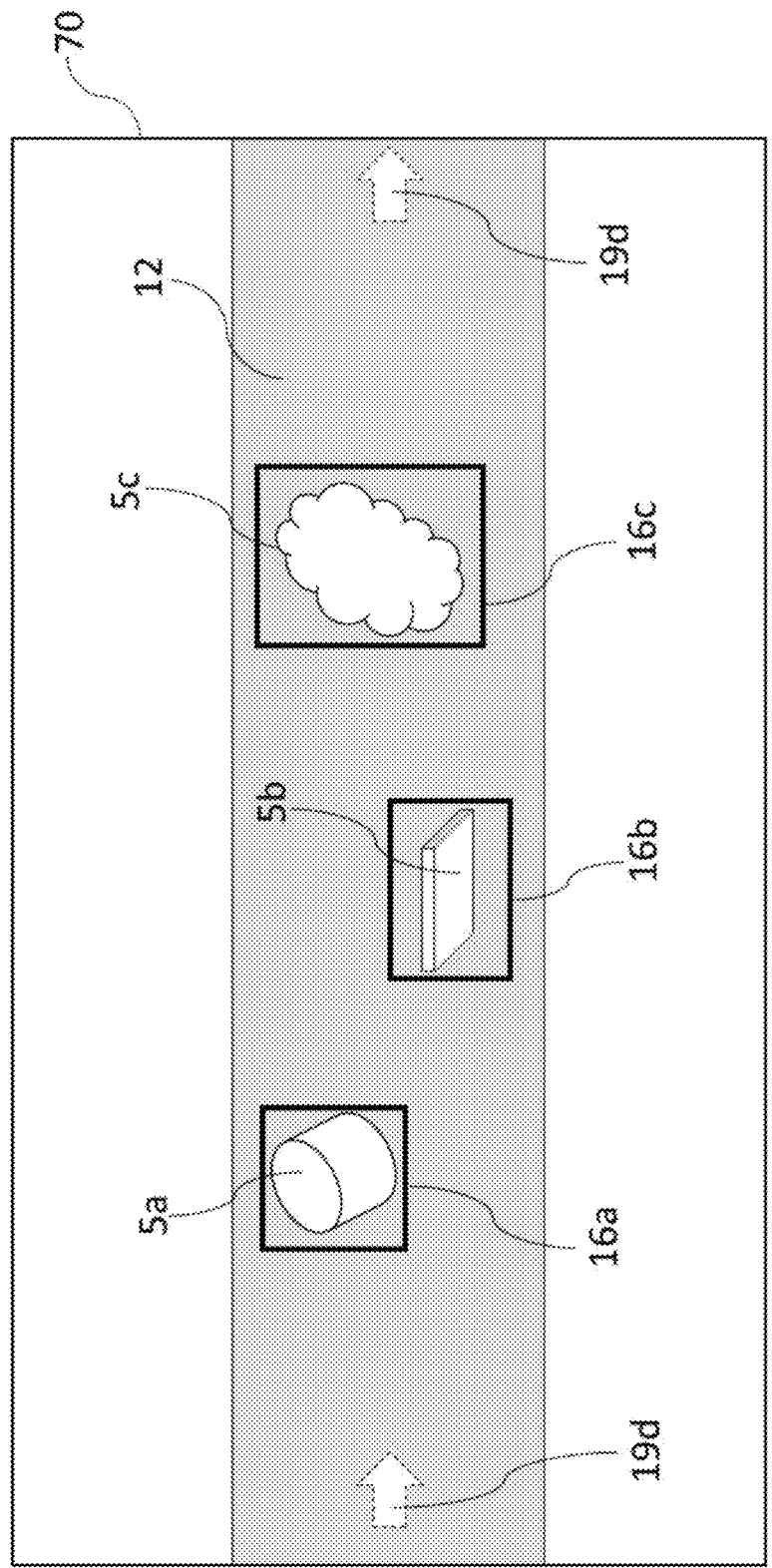
FIG. 18 shows one example of an image used for object recognition and position/posture estimation.

FIG. 18 shows one example of an image used for object recognition and position/posture estimation. As shown in FIG. 18, a belt conveyor 12, an object (5a to 5c), and a recognition bounding box (16a to 16c) are displayed on the image 70. The image 70 is taken by arranging the objects (5a to 5c) on the belt conveyor 12, flowing the objects (5a to 5c) in the direction indicated by the arrow 19d, and using the camera 2 under such a state.

By performing deep learning using the training dataset prior to the use of the trained model, it is possible to recognize the object and estimate its position and posture.

In FIG. 18, only the recognition bounding boxes (16a to 16c) are displayed so as to surround the objects (5a to 5c), but in the computer 4, information on the name of the objects (5a to 5c) and the posture/position of the center of gravity is estimated, and by planning the gripping motion of the robot 13 in advance, it is possible to let the robot 13 perform the sorting work of the objects (5a~5c) based on the information estimated by the computer 4. Specifically, for example, it is possible to arrange a plurality types of products one by one in a predetermined box, such as an assorted gif, or to remove defective products from a large number of products flowing in a lane.

Embodiment 2

Figure 19:
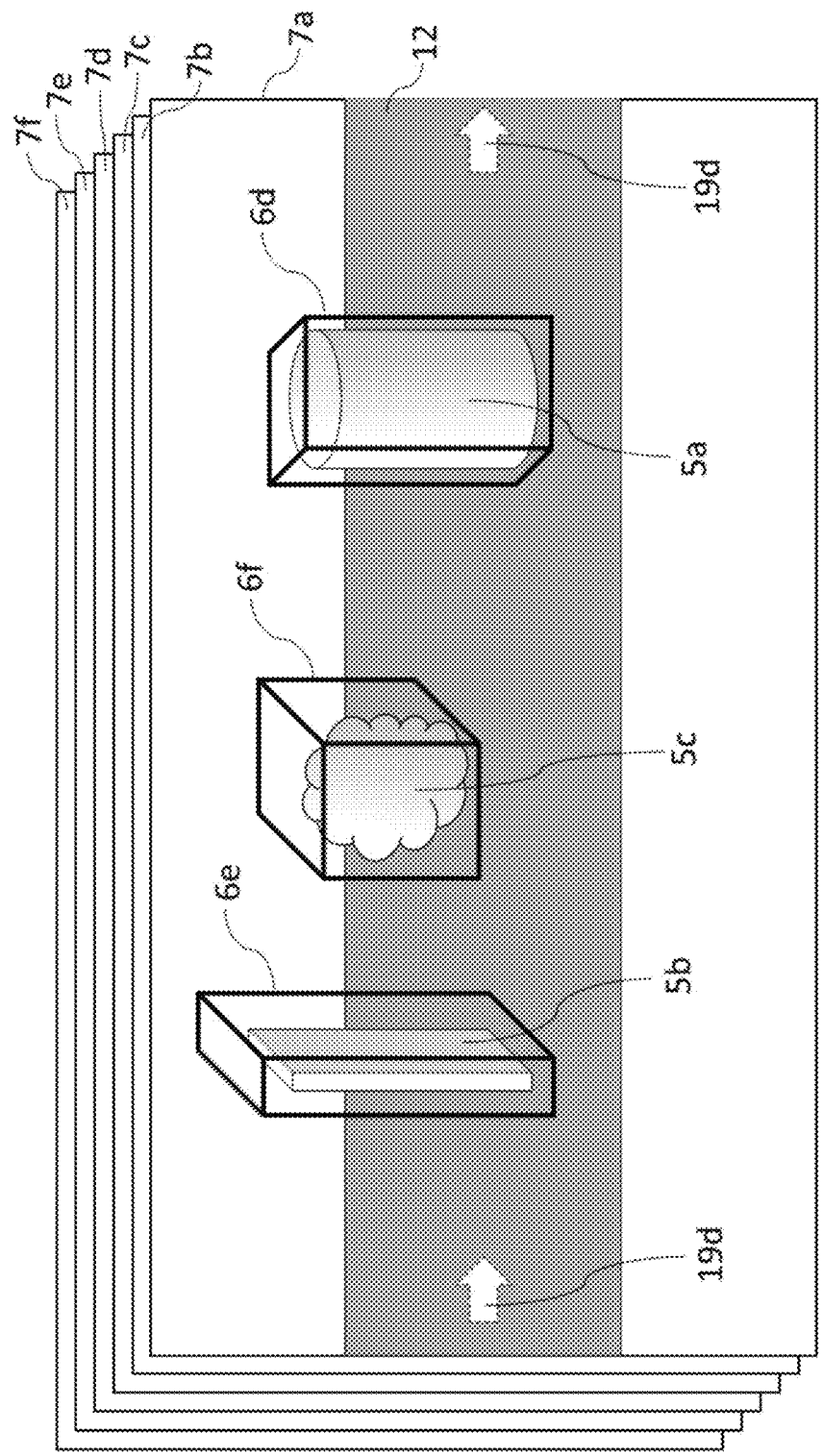
FIG. 19 shows an image diagram used for generating the training dataset of the Embodiment 2.

FIG. 19 shows an image diagram used for generating the training dataset of the Embodiment 2. As shown in FIG. 19, the image 7a shows a belt conveyor 12, the objects (5a to 5c), and bounding boxes (6d to 6f).

In this embodiment, a 3-dimensional bounding box (6d to 6f) is set, but this has become possible by providing a plurality of AR markers 3.

Namely, in this embodiment as well, the training dataset is generated using the plates (14a to 14c), but as shown in FIG. 7, the center point $P_1$ of the circular plate 14a is set as the origin, and as shown in FIG. 5, the object 5 is arranged using the position adjustment guide 18a or the like so that the center of the bottom comes to the origin.

The height, the shape, the width, and the depth of the object 5 are stored in advance in the database 8 shown in FIG. 1 as object information data as attribute information of the object. It is possible to draw a 3-dimensional bounding box (rectangular parallelepiped) from the center point $P_1$ of the circular plate 14a and the position of the camera 2 (the viewing angle of the camera). In actuality, the octagonal camera coordinates of the rectangular parallelepiped can be known without drawing.

Embodiment 3

Figure 20:
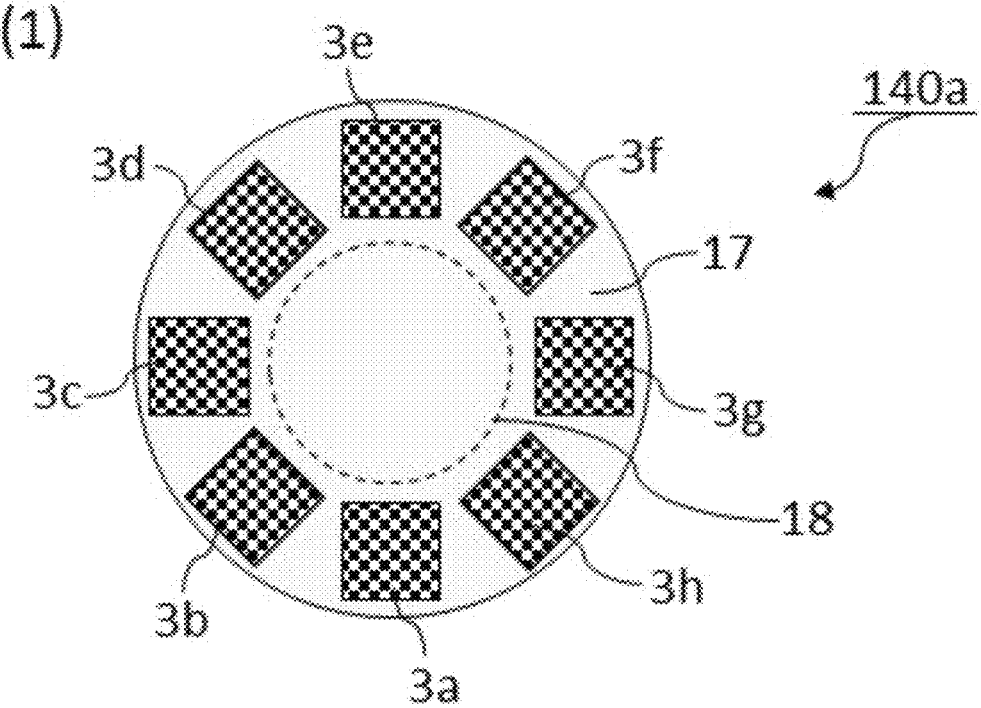
FIG. 20 is a plan view of the training dataset generation jig of the Embodiment 3.
Figure 20:
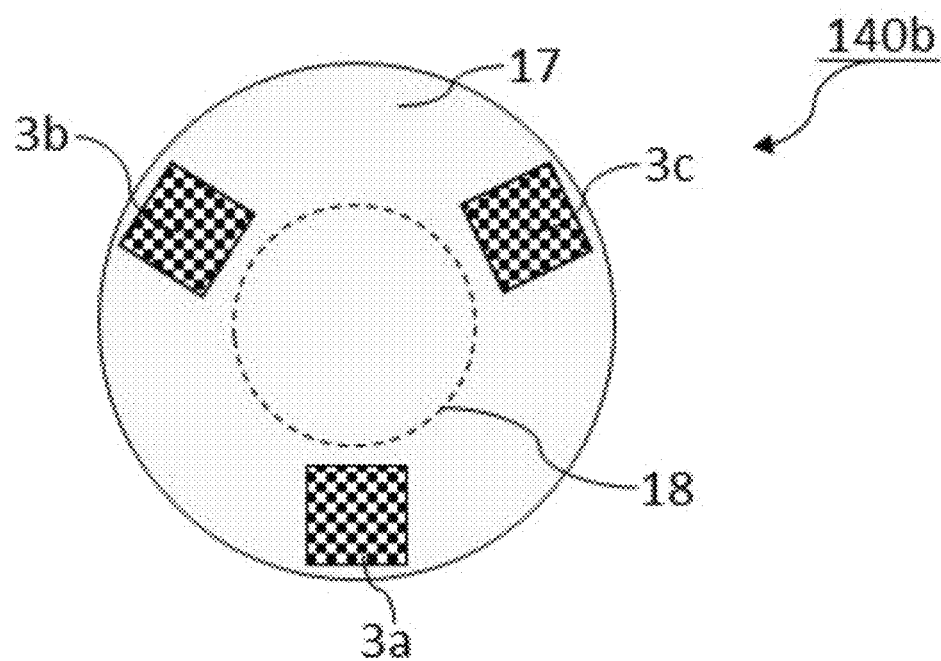

FIG. 20 is a plan view of the training dataset generation jig of the Embodiment 3, and the number of AR markers (1) is eight and (2) is three. As shown in FIG. 20(1), the plate 140a is provided with eight AR markers (3a to 3h) on a circular base portion 17. Further, as shown in FIG. 20(2), the plate 140b is provided with three AR markers (3a to 3c) on a circular base portion 17.

As described above, 12 AR markers (3a to 3l) do not necessarily have to be provided as in the plates (14a to 14c) in the Embodiment 1, and considering the type and shape of the object 5, the manufacturing cost, and the like, a configuration disposed with less number of AR markers. However, it is preferable that two or more AR markers are imaged when the image is taken, because, as described above, by capturing images of two or more AR markers, it is possible to improve the recognition accuracy of the object, and it is also possible to set a 3-dimensional bounding box.

Embodiment 4

Figure 21:
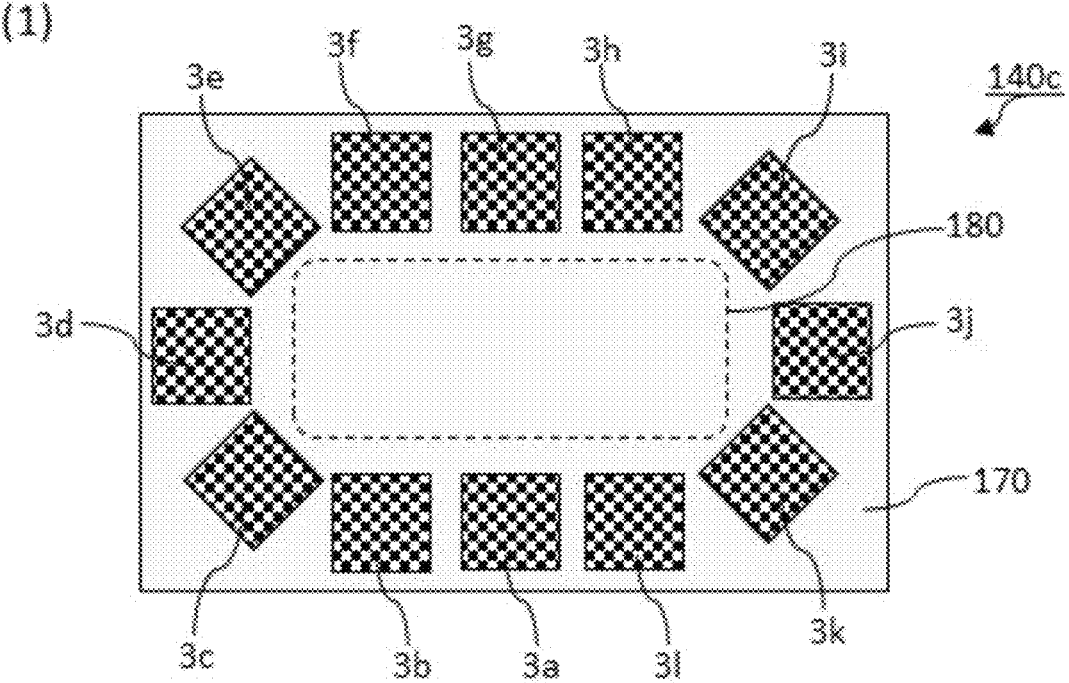
FIG. 21 is a plan view of the training dataset generation jig of the Embodiment 4.
Figure 21:
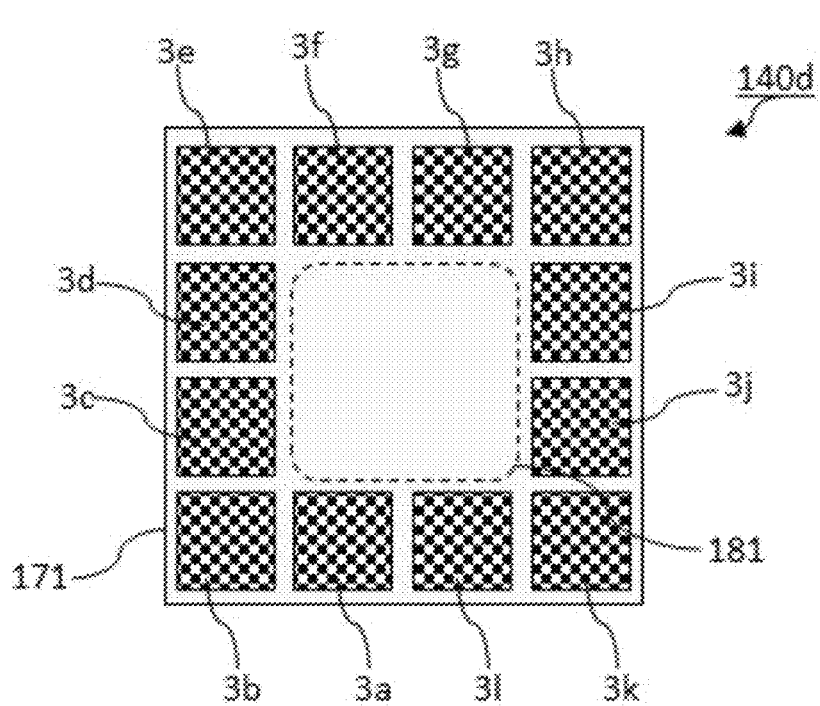

FIG. 21 is a plan view of the training dataset generation jig of the Embodiment 4, (1) shows a rectangular plate, and (2) shows a square plate. As shown in FIG. 21(1), the plate 140c is provided with 12 AR markers (3a to 3l) on a rectangular base portion 170. Further, as shown in FIG. 21(2), the plate 140d is provided with 12 AR markers (3a to 3l) on a square base portion 171. The objects 5 can be arranged in the areas (180, 181), respectively.

As shown in FIGS. 21(1) and 21(2), the shape of the base portion does not necessarily have to be circular as in the plates (14a~14c) in the Embodiment 1, and considering the type and shape of the object 5, rectangular and other shapes can be employed. By designing the shape of the base portion, the type and number of AR markers, etc. according to the type and shape of the object 5, a higher quality training dataset can be produced.

As shown in FIG. 21(1), the AR markers (3c, 3e, 3i, 3k) are arranged at an inclined angle with respect to the rectangular shape of the plate 140c, but such an arrangement is not essential. It suffices if the AR markers surround the area and that the corners of all AR markers are known. Therefore, for example, as shown in FIG. 21(2), AR markers (3a to 3l) may be arranged.

Embodiment 5

Figure 22:
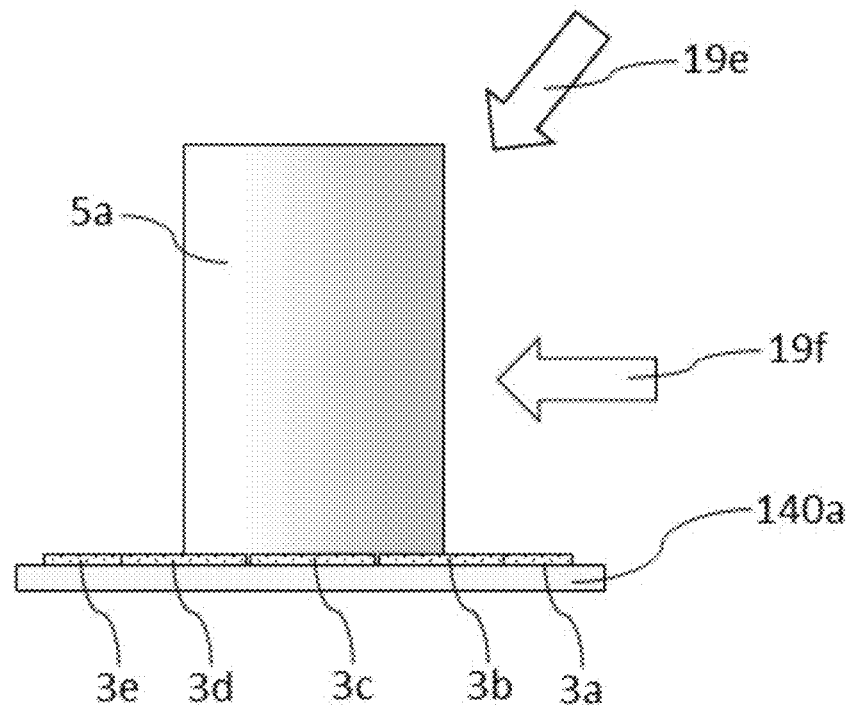
FIG. 22 is an explanatory view regarding an object and an imaging direction.
Figure 22:
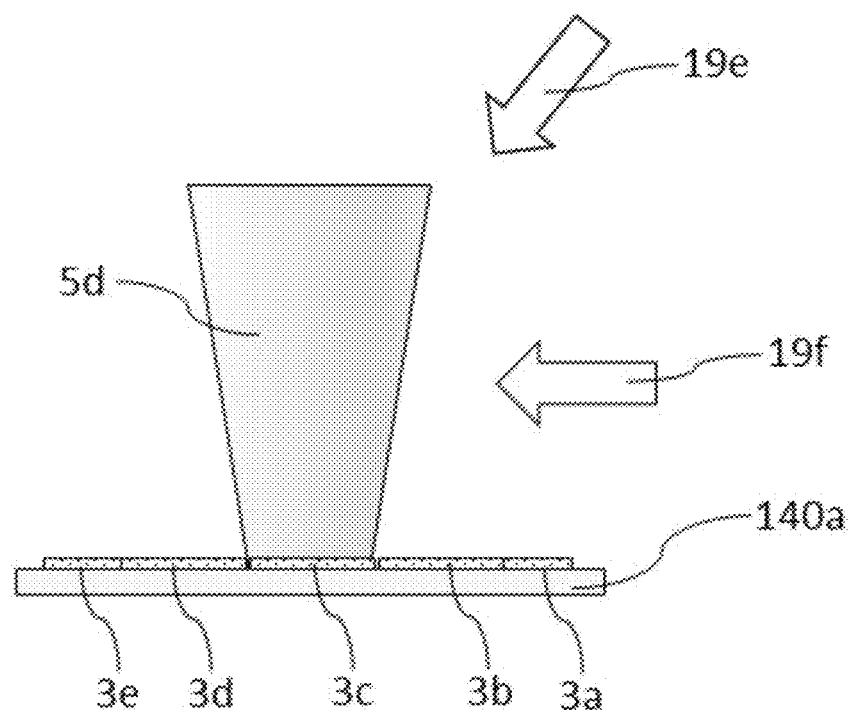

FIG. 22 is an explanatory view regarding an object and an imaging direction, in which (1) is a left side view wherein the object 5a is arranged on the plate 140a shown in the Embodiment 3, and (2) shows a left side view wherein the object 5d is arranged. As shown in FIG. 22(1), if the object arranged on the plate 140a has a cylindrical shape like the object 5a, even if the imaging direction is obliquely upward, the image pickup is possible on both the upper surface and the side surface of the object 5a. However, if the object placed on the plate 140a has an inverted truncated cone shape like the object 5d, and the imaging direction of the camera 2 shown in FIG. 3 is diagonally upward as shown by the arrow 19e, it may be difficult to image the side of the object 5a.

For example, in the case of an inverted truncated cone like the object 5d, it is useful to photograph the side surface of the object 5d by photographing from the side as shown by an arrow 19f, but when the image is taken from the side, there is a problem that it becomes difficult to image the AR markers (3a~3h) provided on the plate 140a.

Figure 23:
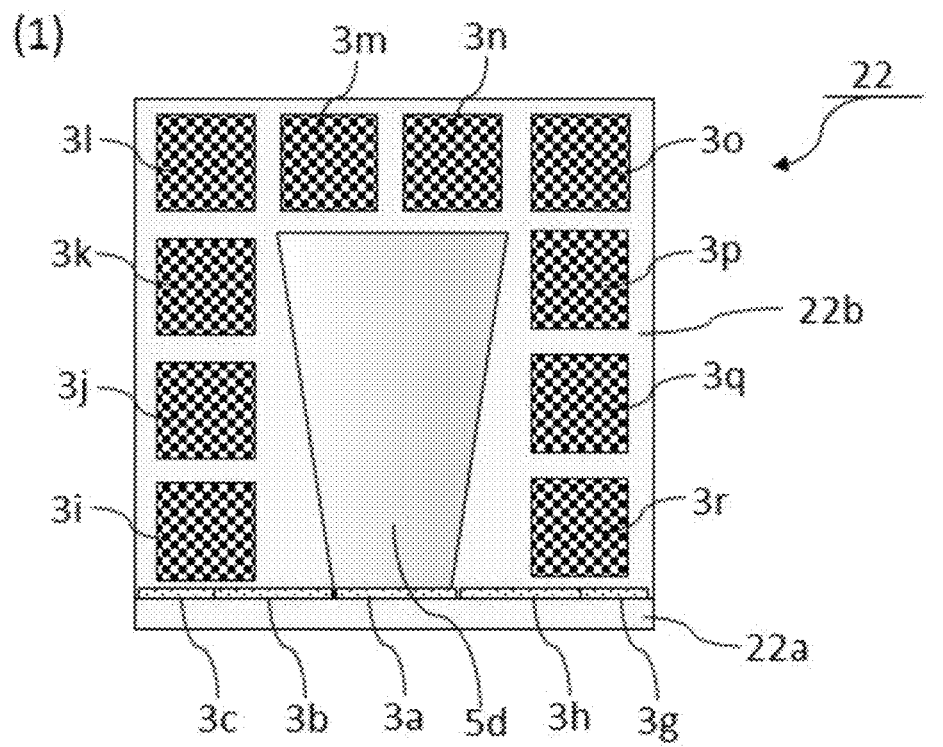
FIG. 23 is an external view of the training dataset generation jig of the Embodiment 5.
Figure 23:
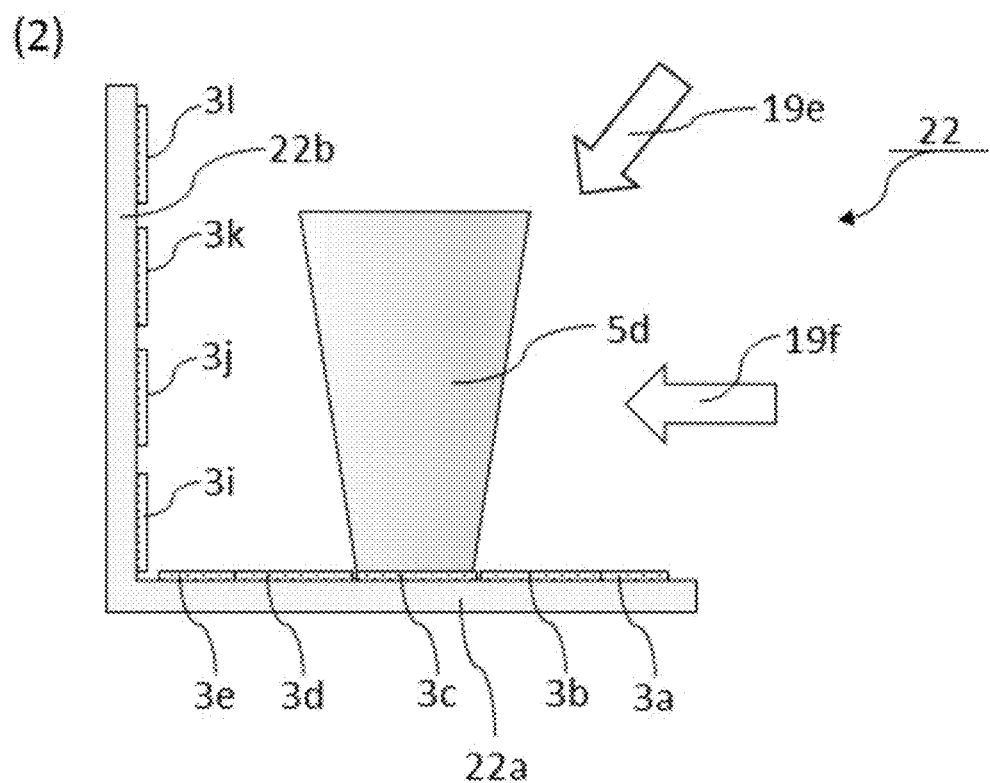

Therefore, instead of a flat plate, an L-shape processed plate may be used. FIG. 23 is an external view of the training dataset generation jig of the Embodiment 5, (1) is a front view, and (2) is a left side view. As shown in FIG. 23(1), the L-shaped plate 22 is composed of a bottom portion 22a, a side surface portion 22b, and AR markers (3a~3r). The bottom portion 22a and the side surface portion 22b are made of resin and integrally molded. AR markers (3a to 3h) are provided on the bottom portion 22a, and AR markers (3i~3r) are provided on the side surface portions 22b. The arrangement of the AR markers (3a~3h) on the bottom 22a is the same as the AR markers (3a~3h) on the plate 140a.

As shown in FIGS. 23(1) and 23(2), when the object 5d is photographed from the direction of the arrow 19f, the object 5d is detected by detecting the AR markers (3i~3r) provided on the side surface portion 22b. Further, when the object 5d is photographed from the direction of the arrow 19e, either the AR marker (3a~3h) provided on the bottom portion 22a or the AR marker (3i~3r) provided on the side surface portion 22b is detected. By doing so, it is possible to recognize the object 5d.

In this way, it is possible to flexibly design the training dataset generation jig according to the shape of the object 5.

Embodiment 6

The transport device and the rotational movement mechanism will be described with reference to FIG. 24. The conveyor 120 shown in FIG. 24 moves the conveyor belt 120a horizontally. The conveyor 120 is a conveyor and moves an object placed on the conveyor belt 120a horizontally.

The plate 14 which is a training dataset generation jig is placed on the conveyor belt 120a, and the object 5 is arranged with the area (not shown) provided in the base portion 17 as a guide, and the conveyor belt 120a is horizontally moved (direction indicated by the arrow 19g), it is possible to efficiently acquire a multi-viewpoint image group of the entire object 5 including the AR marker 3.

Figure 24:
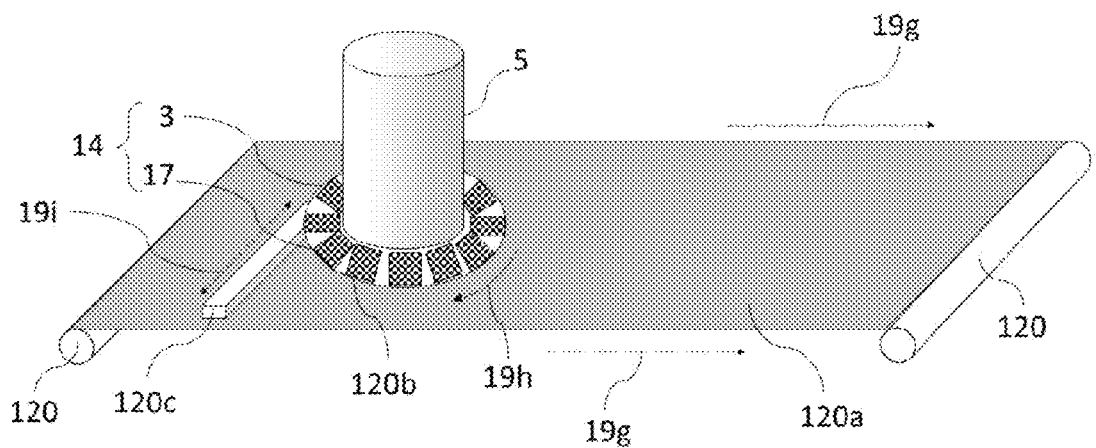
FIG. 24 shows an explanatory diagram of the transport device and the rotational movement mechanism of the Embodiment 6.

Further, as shown in FIG. 24, a plate 14 of the training dataset generation jig is attached to a device combining the rotation mechanism 120b and the linear motion mechanism 120c, and the device is placed on the conveyor belt 120a. By moving the conveyor belt 120a horizontally, it is possible to acquire a multi-viewpoint image group more efficiently. Namely, while the conveyor 120a moves in the direction indicated by the arrow 19g, the rotating mechanism 120b rotates horizontally in the direction indicated by the arrow 19h, and the linear motion mechanism 120c moves horizontally in the direction indicated by the arrow 19i. Thus, the multi-viewpoint image group of the entire object including the marker is efficiently acquired. As a result, the object 5 and the plate 14 can be imaged from all angles by flowing the object 5 and the plate 14 on the conveyor belt 120a only once, and the training dataset can be efficiently produced in a short time.

Note that the moving direction indicated by the arrow 19g and the rotation direction indicated by the arrow 19h may be opposite directions, and may be alternately moving in the forward direction and the opposite direction. Also, the movement direction indicated by the arrow 19i is a reciprocating movement, but it may move in only one direction.

Embodiment 7

A training dataset generation program for causing a computer to execute a part of the processing of the training dataset generation method will be described with reference to FIG. 4. The training dataset generation program relates to 1) the step of setting the bounding box of the object for the multi-viewpoint image group, and 2) the attitude information and the center of gravity position information of the object estimated from the captured image, the object information, and the bounding box. Let the computer perform the steps of associating the information with the captured image and generating a training dataset.

In the step 1) above, the AR marker included in the acquired image is detected by image analysis (step S102), the object information associated with the AR marker is acquired (step S103), and based on the attitude information of the AR marker, the posture of the object is estimated (step S104), the position of the center of gravity of the object is calculated (step S105), and the bounding box surrounding the object is set (step S106).

In step 2) above, the object information, the posture, the position of the center of gravity and the set bounding box information (position, width, height in the image) are associated with the image (step S107), and in a case wherein the AR marker that has not been processed exists, the unprocessed AR marker is processed similarly, and if all the AR markers have been processed (step S108), one image to which the object information, the posture/center of gravity information and the bounding box information are tied up to is output (step S109), and all the captured images are processed. (step S110 )

After the processing for all the images is completed, the plate containing the marker is concealed from the captured images (step S111), a training dataset is generated.

The step of hiding the plate containing the marker from the captured image after the step 2) above (step S111) will be described with reference to FIG. 10.

First, the plate area is detected from the acquired image (step S41). Next, one of the cutout plate shapes is selected (step S42). The plate region is extracted using the shape information approximated in advance (step S43). If there is an untreated plate, the untreated plate is selected (step S42), and the same treatment is performed. After processing all the plates (step S44), all the extracted regions are overwritten with a noise image or a background image (step S45).

Further, an object recognition and position/posture estimation program for causing a computer to execute a part of the processing of the object recognition and position/posture estimation method will be described with reference to FIG. 17. The object recognition and position/posture estimation program consists of a) a step of detecting the name of an object by image recognition and creating a bounding box for recognition from a newly captured image, and b) a step of generating a partial image cutout of the bounding box and estimating the posture of the detected object by using a trained model based on the partial image, and c) a step of acquiring the center of gravity, width, and height of the bounding box for recognition and a step of estimating the detected center of gravity of the detected object, to have a computer executer the steps.

In step a) above, an object is detected by image recognition, a position in the image coordinate system is detected (step S302), object information (name, etc.) is acquired, and a bounding box for recognition is set (step S303).

In step b) above, one of the set recognition of bounding boxes is selected (step S304), the inside of the recognition bounding box is cut out from the captured image (step S305), and the posture of the object is estimated using the learnt model classifier machine learning such as deep learning is performed. (step S306)

In step c) above, the width and height of the recognition bounding box are acquired (step S307), and the position of the center of gravity of the object in the 3-dimensional coordinates of the real space is estimated by the regression device of the trained model (step S308).

Embodiment 8

In the present embodiment, regarding a case of a single visual marker (hereinafter, a single marker), a case of plurality of markers (hereafter, a plurality of markers) and a case of manual operation, the training dataset generation time, object recognition accuracy and the position-posture estimation accuracy are compared.

Evaluation Result of Training Dataset Generation Time

Table 2 below shows the measurement results of the training dataset generation time in the case of a single marker, multiple markers, and manual operation. As the captured images to be compared, 500 images were taken for learning in each of the case of a single marker, the case of a plurality of markers, and the case of manual operation.

Figure 25:
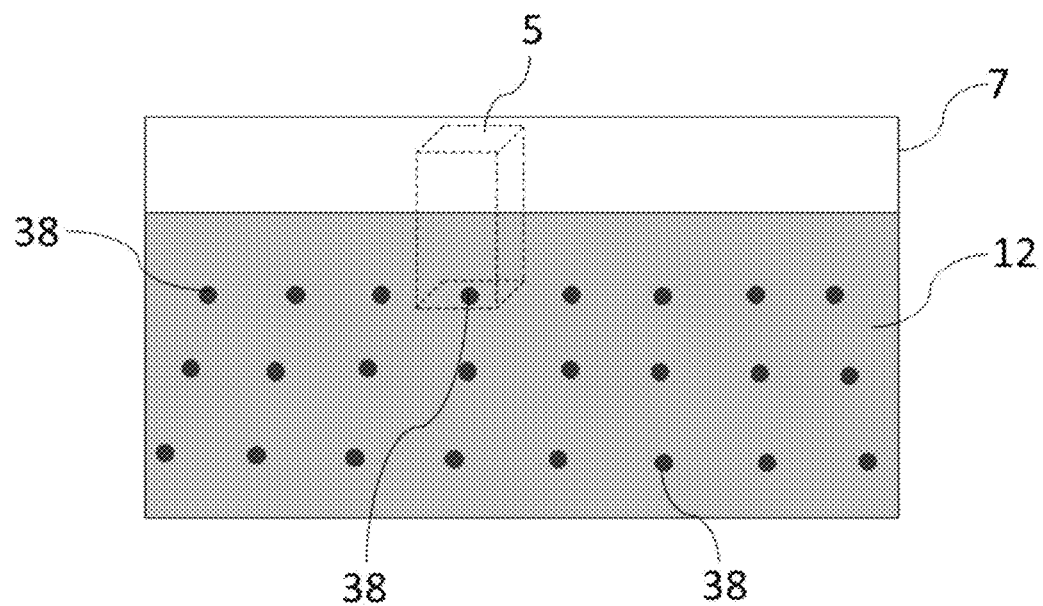
FIG. 25 shows an explanatory diagram of the photographing method in the comparative experiment of the Embodiment 8.

FIG. 25 shows an explanatory diagram of the photographing method in the comparative experiment of the Embodiment 8. As shown in FIG. 25, when shooting, points 38 of vertical 3×horizontal 8 are set in the image so that the data is not biased, and the arrangement is rotated in 45° increments for each point. I took a picture. Manual annotation was performed by two people. In the present specification, the annotation refers not only to the setting of the bounding box for the captured image but also to the association of the object information.

TABLE 2

|  | Single marker | Plurality of markers | Hand |
| --- | --- | --- | --- |
| Shooting time (min.) | 75 | 436 | 80 |
| Annotation time (min.) | 32.2 | 0 | 886 |
| Total time (min.) | 112.2 (1.9 hours) | 436 (7.3 hours) | 966 (16.1 hours) |

As shown in Table 2 above, in the case of a single marker, the shooting time was 75 minutes, the time required for annotation was 32.2 minutes, and the total time was 112.2 minutes. In the case of plurality of markers, the shooting time was 436 minutes, the annotation time was 0 minutes, and the total time was 436 minutes. In addition, the shooting time by hand was 80 minutes, the time required for annotation was 886 minutes, and the total time was 966 minutes.

From the above, it can be said that the generation of the training dataset by a single marker succeeded in improving the efficiency by 88.4% as compared with the generation of the training dataset by hand. In addition, it can be said that the generation of the training dataset by the plurality of markers succeeded in improving the efficiency by 54.9% as compared with the generation of the training dataset by hand.

Results of Comparative Experiment on Object Recognition

Tables 3 to 5 below show the measurement results regarding the object recognition accuracy in the case of a single marker, in the case of multiple markers, and in the case of manual operation. As experimental conditions, "F-measure", "Precision" and "Recall" were measured for the bottle A, the bottle B, the pouch A, the pouch B, the can A and the can B. The bottle is a PET bottle.

Here, "Recall" is the recall ratio, which means the ratio of those that are actually positive and those that are predicted to be positive, which means the ratio of those that are actually positive and those that are predicted to be positive, and quantifies how many things that must be found are found and the minimum value is 0%, and 100% or closer to 100% is better. In addition, "Precision" is an index showing the accuracy of the judgment, and arithmetic is performed from TP/(TP+FP). (TP: True Positive, FP: False Positive) Precision also has a minimum value of 0%, and the closer it is to 100%, the better. Further, the "F-measure" is one of the evaluation scales of the prediction result in machine learning, and indicates the harmonic mean of the accuracy and the recall rate. Specifically, the F-measure is calculated from 2×B×A/(A+B), where the Recall value is "A" and the Precision value is "B". The minimum F-measure is 0%, and the closer it is to 100%, the better.

TABLE 3

|  | F-measure(%) | Precision(%) | Recall(%) |
| --- | --- | --- | --- |
| Bottle A | 100 | 100 | 100 |
| Bottle B | 98.5 | 99 | 98 |
| Pouch A | 78.9 | 83 | 75.3 |
| Pouch B | 83.1 | 84.4 | 81.8 |
| Can A | 82.1 | 91 | 74.7 |
| Can B | 81 | 94.4 | 70.8 |
| Average | 87.3 | 92 | 83.4 |

TABLE 4

|  | F-measure(%) | Precision(%) | Recall(%) |
| --- | --- | --- | --- |
| Bottle A | 98 | 99 | 97 |
| Bottle B | 93.8 | 96.8 | 91 |
| Pouch A | 93.6 | 98.9 | 88.9 |
| Pouch B | 93.2 | 96.7 | 90 |
| Can A | 97.4 | 100 | 95 |
| Can B | 98.5 | 99 | 98 |
| Average | 95.8 | 98.4 | 93.3 |

TABLE 5

|  | F-measure(%) | Precision(%) | Recall(%) |
| --- | --- | --- | --- |
| Bottle A | 99 | 98 | 100 |
| Bottle B | 98.5 | 98 | 99 |
| Pouch A | 71.9 | 88.2 | 60.6 |
| Pouch B | 79.8 | 70.7 | 91.6 |
| Can A | 81.8 | 78.6 | 85.3 |
| Can B | 76.8 | 92.7 | 65.6 |
| Average | 84.6 | 87.7 | 83.7 |

As shown in Tables 3 to 5 above, the average F-measure in the case of a single marker is 87.3%, the average F-measure in the case of multiple markers is 95.8%, and the F-measure in the case of manual operation is 84.6%, and it can be confirmed that the recognition performance of both the single marker and the plurality of markers is higher than that of human hands.

Further, when comparing a single marker and a plurality of markers, as shown in Tables 3 and 4, in the F-measure, Precision and Recall, the four target objects of the pouch A, the pouch B, the can A and the can B have multiple markers. Thus, it can be confirmed that the recognition accuracy is higher in the case of multiple markers.

On the other hand, for the PET bottles, the single marker has higher recognition accuracy. That is, for the bottle A, the F-measure, Precision and Recall are all 100% in the case of a single marker, and for the bottle B, the F-measure is 98.5% and Precision is 99% in the case of a single marker., Recall is 98%, which confirms that the recognition accuracy is higher than that of multiple markers. However, even in the case of multiple markers, for the bottle A, the F-measure is 98%, Precision is 99%, and Recall is 97%, and for the bottle B, F-measure is 93.8%, Precision is 96.8%, and Recall. Shows a high value of 91%, which is not much different from the case of a single marker.

Therefore, it is considered that the method using multiple markers is useful as a training dataset generation jig for recognizing a wider variety of target objects with high accuracy.

Results of Comparative Experiment on Position/Posture Estimation

Figure 26:
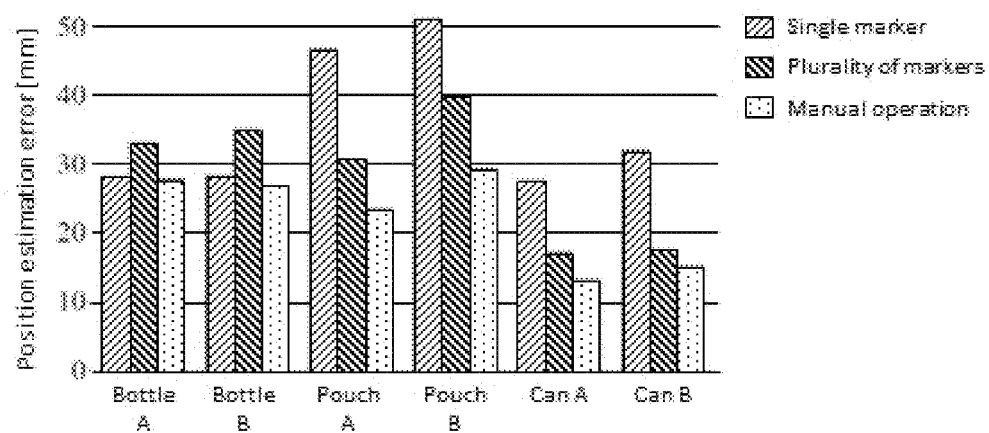
FIG. 26 is a graph showing the results of comparative experiments related to position/posture estimation.
Figure 26:
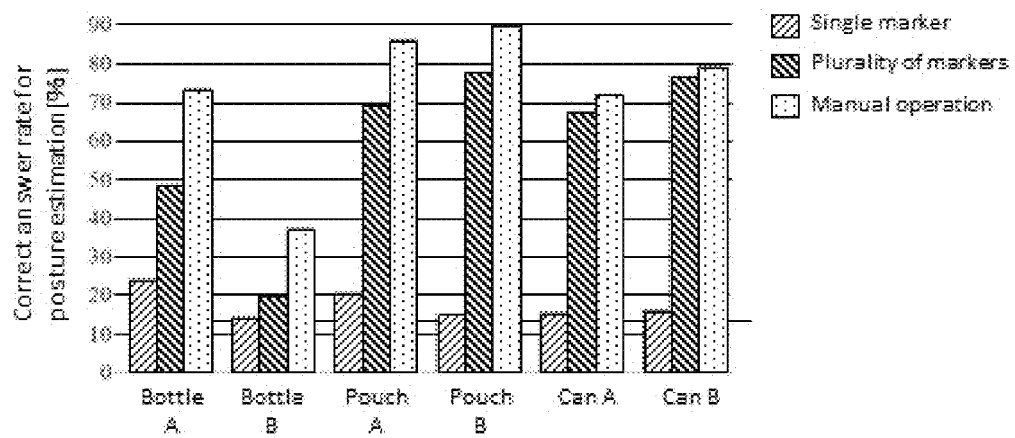

FIG. 26 is a graph showing the results of comparative experiments related to position/posture estimation, and FIG. 26(1) is a graph showing position estimation errors in the case of a single marker, the case of a plurality of markers, and the case of manual operation. In FIG. 26, the bottle A, the bottle B, the pouch A, the pouch B, the can A, and the can B are compared, and the numerical values in the graph are described by rounding off the second decimal place.

As shown in FIG. 26(1), the position estimation error in the case of manual operation is 28.0 mm for the bottle A, 27.0 mm for the bottle B, 23.6 mm for the pouch A, and 29.4 mm for the pouch B. It can be confirmed that the can A is 13.3 mm and the can B is 15.2 mm, which are smaller than in the case of a single marker or a plurality of markers.

On the other hand, in the case of a single marker, the bottle A is 28.3 mm, the bottle B is 28.4 mm, the pouch A is 46.8 mm, the pouch B is 51.1 mm, the can A is 27.7 mm, and the can B is. 32.1 mm, and in the case of multiple markers, the bottle A is 33.2 mm, the bottle B is 35.1 mm, the pouch A is 30.7 mm, the pouch B is 39.9 mm, the can A is 17.3 mm, and the can B is 17.7 mm.

Therefore, for the bottle A and the bottle B, it can be seen that the error in the case of a single marker is almost the same as that in the case of manual operation. Further, in the case of a plurality of markers, a slightly larger error was confirmed for the bottle A and the bottle B than for a single marker, but the difference was small, and moreover, the pouch A, the pouch B, the can A and the can B were confirmed. It was found that the error can be reduced as compared with the case of a single marker.

FIG. 26(2) is a graph showing the correct answer rate of posture estimation in the case of a single marker, in the case of a plurality of markers, and in the case of manual operation. Similar to the position estimation, the bottle A, the bottle B, the pouch A, the pouch B, the can A and the can B are compared.

As shown in FIG. 26(2), the correct answer rate for posture estimation by hand is 73.4% for the bottle A, 37.4% for the bottle B, 86.1% for the pouch A, and 89.0% for the pouch B. 9%, the can A was 71.9%, and the can B was 79.1%, which were less than in either case of a single marker or multiple markers.

Moreover, in the case of a single marker, the correct answer rate for posture estimation is 24.0% for the bottle A, 14.3% for the bottle B, 20.5% for the pouch A, 14.8% for the pouch B, and for the can A 15.5%, and for the can B 16.2%.

On the other hand, in the case of multiple markers, the correct answer rate for posture estimation was 48.5% for the bottle A, 19.8% for the bottle B, 69.3% for the pouch A, 77.5% for the pouch B, and the cans. A is 67.4% and the can B is 76.5%, and it turned out that a higher correct answer rate is obtained for all of the bottle A, the bottle B, the pouch A, the pouch B, the can A and the can B than in the case of a single marker.

Summary of Experimental Results

From the above, it was found that when a single marker was used, the efficiency of data acquisition time was improved by 88.4%, and sufficient performance was obtained in object recognition. On the other hand, when multiple markers are used, it was understood that the efficiency of data collection time can be improved by 54.9%, and sufficient performance can be obtained not only in object recognition but also in position/posture estimation.

Embodiment 9

About the Effect of Concealment Processing on a Single Marker

In this Embodiment, in the case of manual collection, the case where the single marker is concealed by overwriting of the background image in the automatic collection and the case where the single marker is concealed by overwriting the noise image in the automatic collection are compared from the aspect of object recognition accuracy. As the target objects, the bottle A, the bottle B, the pouch A, the pouch B, the can A and the can B were compared as in the Embodiment 8.

Table 6 below shows the comparison results of the F-measure regarding the object recognition accuracy in the case of manual work, when the background is concealed, and when the noise is concealed.

TABLE 6

|  | F-measure (%) | | |
| --- | --- | --- | --- |
|  | Manually | Background | Noise |
| Bottle A | 99 | 97.1 | 100 |
| Bottle B | 98.5 | 98 | 98.5 |
| Pouch A | 71.9 | 81.8 | 78.9 |
| Pouch B | 79.8 | 85.9 | 83.1 |
| Can A | 81.8 | 51.9 | 82.1 |
| Can B | 76.8 | 55.3 | 81 |
| Average | 84.6 | 78.3 | 87.3 |

As shown in Table 6 above, for the bottle A, the F-measure in the case of manual operation is 99%, whereas the F-measure in the case of manual concealment treatment is 97.1%. On the contrary, when the concealment treatment was performed to make noise lower, the F-measure was 100%, which was higher than that in the case of manual operation.

For the bottle B, the F-measure when manually used was 98.5%, whereas when the background was concealed, it was 98%, which was lower than when it was manually concealed, and the noise was concealed. In the case of 98.5%, the same recognition rate as in the case of manual operation was obtained.

On the other hand, for pouch A, the F-measure by hand was 71.9%, but when the background was concealed, it was 81.8%, and when the noise was concealed, it was 78.9%, either of which was higher than the manual operation case.

Regarding the pouch B, the F-measure was 79.8% when it was manually used, but it was 85.9% when the background was concealed, and 83.1% when the noise was concealed, obtaining the recognition rate higher than that of the manual case.

For the can A, the F-measure when manually used is 81.8%, whereas when the background is concealed, it is 51.9%, which is lower than when manually concealed, and conversely, when it is concealed as noise, F-measure becomes 82.1% which was higher than the case of manual operation.

For the can B, the F-measure when manually used is 76.8%, whereas when the background is concealed, it is 55.3%, which is lower than when manually concealed, and conversely, then it is concealed as noise, F-measure was 81%, which was higher than that in the case of manual operation.

From the above, when the single marker was concealed to have the same color as the background, a higher recognition rate than when manually worked on was obtained only for pouch A and pouch B, but when the concealment treatment was performed in the single marker, the recognition rate of all of the bottle A, the bottle B, the pouch A, the pouch B, the can A and the can B were equal to or higher than that in the case of manual operation. Therefore, it was found that the recognition rate is improved for a wide variety of objects when the concealment processing for noise is performed on a single marker.

INDUSTRIAL APPLICABILITY

The present invention is useful as a factory automation system using an industrial robot. Namely, an industrial robot that performs machine learning using the training dataset generated by the training dataset generation method of the present invention, an industrial robot that uses the object recognition and position/posture estimation method of the present invention, or the industrial robot equipped with the object recognition and position/posture program can be utilized for sorting work and processing work in the food industry and the logistics industry. It can also be used as a security system in buildings and the like.

DESCRIPTION OF SYMBOLS

1 Robot control system
2 Camera
3, 3a~3r AR marker
4, 40, 41 Computer
5, 5a~5e Object
6a~6c Bounding box
7a~7f Image
8, 80, 81 Database
9 Model generation computer
9a Classifier
9b Regressor
10 Training dataset generation device
11 Object recognition and position/posture estimation device
12 Belt conveyor
13 Robot
13a Robot arm
14, 14a~14c, 140a~140d Plate
15a~15c Concealing portion
16a~16f Recognition bounding box
17, 170, 171 Base portion
18, 180, 181 Area
18a Position adjusting guide
18b Orientation adjustment guide
19a~19i Arrow
20, 21 Image pickup means
L-shaped plate
22a Bottom portion
22b Side surface portion
30 Training dataset generation jig
33 Reference marker (AR marker)
Point
39a Cylindrical shape
39b Truncated cone shape
40a AR marker recognition means
40b Object recognizing means
40c Bounding box setting means
40d Posture estimation means
40e Center of gravity position estimation unit
40f Bounding box assigning unit
40g Training dataset generation jig area concealing means
40h Detection means
40i Extraction means
40j Concealing means
41a Object recognition unit
41b Recognition bounding box setting means
41c Already learned model
120 Conveyor
120a Conveyor belt
120b Rotation mechanism
120c Linear motion mechanism
C Corner
P Center point

What is claimed is:

1. A method performed by a computer for generating a training dataset, the method comprising:
   acquiring, by the computer, an image group, the image group including images of an object and a visual marker plate, the images taken from a plurality of viewpoints, the visual marker plate including augmented reality visual markers and a plate area, at least one image showing a base portion of the object at least partially located within the plate area;
   the computer recognizing the visual marker in the acquired image group;
   utilizing, by the computer, the recognized visual marker to acquire object information which is associated with the visual marker;
   setting, by the computer, a bounding box for the object based at least in part on the acquired object information
   generating, by the computer, a reconstructed image group from the acquired image group using the bounding box, the visual marker plate concealed in the reconstructed image group; correlating posture information and position information of the object presumed from the image, the object information and information of the bounding box with the image; and registering the reconstructed image group as part of the training dataset.

2. The method of claim 1, wherein the visual marker plate includes multiple visual markers which are arranged around at least a portion of the plate area and outside a convex hull of the plate area.

3. The method of claim 1, wherein generating the reconstructed image group comprises:
   extracting from the images a visual marker plate region which corresponds to only the visual marker plate; and
   overwriting the visual marker plate region with a background image or a noise image, thereby concealing the visual marker plate.

4. The method of claim 3, wherein extracting the visual marker plate region comprises at least one of the following:
   utilizing predetermined object approximate shape information; or
   utilizing a previously trained machine learning model.

5. The method of claim 2, wherein the plate area is circular, or elliptical, or rectangular.

6. The method of claim 2, wherein the plate area is circular, and the visual marker is arranged in a manner to surround the plate area by having a central direction of the plate area as a reference direction.

7. The method of claim 2, wherein the plate area includes a bottom portion within a bottom plane and a side portion within a side plane, and wherein an angle between the bottom plane and the side plane is in a range from ten to ninety degrees.

8. The method of claim 2, wherein the bounding box is a 3-dimensional bounding box with the plate area being a reference position.

9. The method of claim 1, wherein the visual marker includes a two-dimensional pattern marker including an augmented reality marker or a three-dimensional marker.

10. The method of claim 1, wherein the visual marker includes an identification of a training dataset generation jig.

11. The method of claim 1, wherein the visual marker plate includes an object adjusting guide, and the method further comprises:

adjusting a position of the object based on the object adjusting guide;

acquiring an image of the adjusted object and the visual marker plate;

generating a reconstructed adjusted object image group based on at least the acquired image of the adjusted object; and registering the reconstructed adjusted object image group as part of the training dataset.

12. The method of claim 1, wherein the computer is further configured to compute at least one of the following based on the acquired image group:

differential position information representing a difference between a position of the target object disposed with the plate area as a guide and a position of a reference pose at a predefined reference position coordinate; and differential posture information representing a difference between a posture of the target object disposed with the plate area as a guide and a reference pose at a predefined reference coordinate, calculated by using a captured image of the visual marker and a relative positional relationship between the visual marker and the target object.

13. The method of claim 1, wherein acquiring the image group includes at least one of the following:

imaging while the object is placed on a training dataset generation jig and conveyed;

imaging while the object is placed on a training dataset generation jig and rotated; and imaging while the object is moved.

14. An object recognition system, comprising:

a camera having a viewing angle; and a computer in operable communication with the camera and having a machine learning model, the machine learning model trained or undergoing training, the computer configured to perform object recognition on an image received from the camera, the machine learning model trained or undergoing training using a training dataset generated by (a) acquiring an image group, the image group including one or more images of a training object and a visual marker plate, the visual marker plate including augmented reality visual markers and a plate area, at least one image showing a base portion of the training object at least partially located within the plate area, (b) recognizing the visual marker in the acquired image group, (c) using the recognized visual marker to acquire object information which is associated with the visual marker, (d) setting a bounding box for the training object based at least in part on the acquired object information, (e) generating a reconstructed image group from the acquired image group using the bounding box, the visual marker plate concealed in the reconstructed image group, correlating posture information and position information of the object presumed from the image, the object information and information of the bounding box with the image, and (f) registering the reconstructed image group as part of the training dataset.

15. The object recognition system of claim 14, further comprising an industrial robot configured to receive object recognition information from the computer.

16. The object recognition system of claim 14, wherein the computer is further configured to perform at least one of the following based on the acquired image group:

estimate a posture of the target object;

estimate a position of the target object in a 3-dimensional coordinate in real space; or set the bounding box using the plate area as a reference position, with the bounding box having at least two dimensions.

17. The object recognition system of claim 14, wherein the machine learning model includes at least one of the following:

a classifier which classifies objects;

a classifier which estimates object postures;

a classifier which estimates object positions;

a regressor which recognizes objects;

a regressor which estimates object postures; or a regressor which estimates object positions.

18. The object recognition system of claim 14, wherein the image group depicts a plurality of target objects, and for each of at least two target objects the system sets a respective bounding box, determines a name that is associated with the target object, calculates an estimated posture of the target object, and calculates an estimated position of the target object in a three-dimensional coordinate space.

19. The object recognition system of claim 14, wherein the image is an image imaged under an environment matching or approximated to match a manufacturing environment of the training data.

20. A training dataset generation device comprising:

a training dataset generation jig including a base portion with an area, the jig configured to guide of placement of an object, and the jig configured with a visual marker indicating object information related to the object;

an imaging means for acquiring an image group including said visual marker with the object placed;

a means for acquiring said object information associated with said visual marker acquired from said image group;

a means for generating a reconstituted image group by conducting concealment processing of region, from said image group, corresponding to said visual marker or said training dataset generation jig;

a means for setting a bounding box of an object against the acquired image group;

a means for generating a training dataset for object recognition of the object and presuming a position or a posture of the object by utilizing posture information and position information and information about said bounding box; and a means for generating a training dataset for conducting object recognition and position estimation or posture estimation.

* * * * *